US012664908B2

(12) United States Patent
Gordon et al.

(10) Patent No.: US 12,664,908 B2
(45) Date of Patent: Jun. 23, 2026

(54) CONTENT-DRIVEN VIRTUAL AGENT FACILITATOR FOR ONLINE GROUP ACTIVITY

(71) Applicant: Ramot at Tel-Aviv University Ltd., Tel-Aviv (IL)

(72) Inventors: Goren Gordon, Tel-Aviv (IL); Elinor Mizrahi, Tel-Aviv (IL)

(73) Assignee: Ramot at Tel-Aviv University Ltd., Tel-Aviv (IL)

( * ) Notice: Subject to any disclaimer, the term of this patent is extended or adjusted under 35 U.S.C. 154(b) by 322 days.

(21) Appl. No.: 18/287,036

(22) PCT Filed: May 3, 2022

(86) PCT No.: PCT/IL2022/050459
§ 371 (c)(1),
(2) Date: Oct. 16, 2023

(87) PCT Pub. No.: WO2022/234577
PCT Pub. Date: Nov. 10, 2022

(65) Prior Publication Data
US 2024/0203279 A1     Jun. 20, 2024

Related U.S. Application Data

(60) Provisional application No. 63/183,681, filed on May 4, 2021.

(51) Int. Cl.
*G09B 5/06*          (2006.01)
*G06V 40/16*         (2022.01)
(Continued)

(52) U.S. Cl.
CPC ............. *G09B 5/06* (2013.01); *G06V 40/174* (2022.01); *G10L 15/22* (2013.01); *G10L 25/63* (2013.01)

(58) Field of Classification Search
CPC ............. G09B 5/06; G09B 7/02; G06N 20/00
See application file for complete search history.

(56) References Cited

U.S. PATENT DOCUMENTS 8,156,060 B2    4/2012  Borzestowski
9,148,394 B2    9/2015  Lynch et al.
(Continued)

FOREIGN PATENT DOCUMENTS

CN          106919251        7/2017
CN          112083806        12/2020
WO     WO 2022/234577        11/2022

OTHER PUBLICATIONS

International Preliminary Report on Patentability Dated Nov. 16, 2023 From the International Bureau of WIPO Re. Application No. PCT/IL2022/050459 (7 Pages).
(Continued)

*Primary Examiner* — Robert J Utama

(57)          ABSTRACT

The disclosure is of a virtual agent (web based or robotic) for controlling group activities, such as learning and discussion. The aim is enhancing the effectivity of the activity by maintaining an effective, positive atmosphere and equitable participation.

The agent applies multimodal input, comprising video and sound to monitor certain aspects of the group dynamics and their facets, pertaining to the users. Some aspects and facets thereof may trigger facilitation patterns, which may be performed using multimodal output.

The agent uses a set of preset behavior, emotional patterns and facilitation patterns. The agent is trained using a dataset of recorded group activities and machine learning algorithms, and may apply online learning for optimization and personalization of the facilitation patterns and the associated enticers.

21 Claims, 15 Drawing Sheets

(51) Int. Cl.
     *G10L 15/22*         (2006.01)
     *G10L 25/63*         (2013.01)

(56)               References Cited

U.S. PATENT DOCUMENTS

| | | |
|---|---|---|
| 9,262,175 B2 | 2/2016 | Lynch et al. |
| 9,560,089 B2 | 1/2017 | Lynch et al. |
| 9,679,300 B2 | 6/2017 | Lynch et al. |
| 12,124,811 B2 * | 10/2024 | Carbajales ............ G06F 18/214 |
| 2014/0164532 A1 | 6/2014 | Lynch |
| 2014/0164953 A1 | 6/2014 | Lynch |
| 2014/0205990 A1 * | 7/2014 | Wellman .................. G09B 7/00 |
| | | 434/362 |
| 2017/0154543 A1 * | 6/2017 | King ........................ G09B 7/02 |
| 2017/0160813 A1 | 6/2017 | Divakaran et al. |
| 2019/0291277 A1 | 9/2019 | Oleynik |
| 2021/0390876 A1 * | 12/2021 | Publicover .............. G09B 7/02 |

OTHER PUBLICATIONS

International Search Report and the Written Opinion Dated Oct. 6, 2022 From the International Searching Authority Re. Application No. PCT/IL2022/050459. (10 Pages).
Communication Pursuant to Article 94(3) EPC Dated Nov. 18, 2025 From the European Patent Office Re. Application No. 22798778.1 (10 Pages).

* cited by examiner

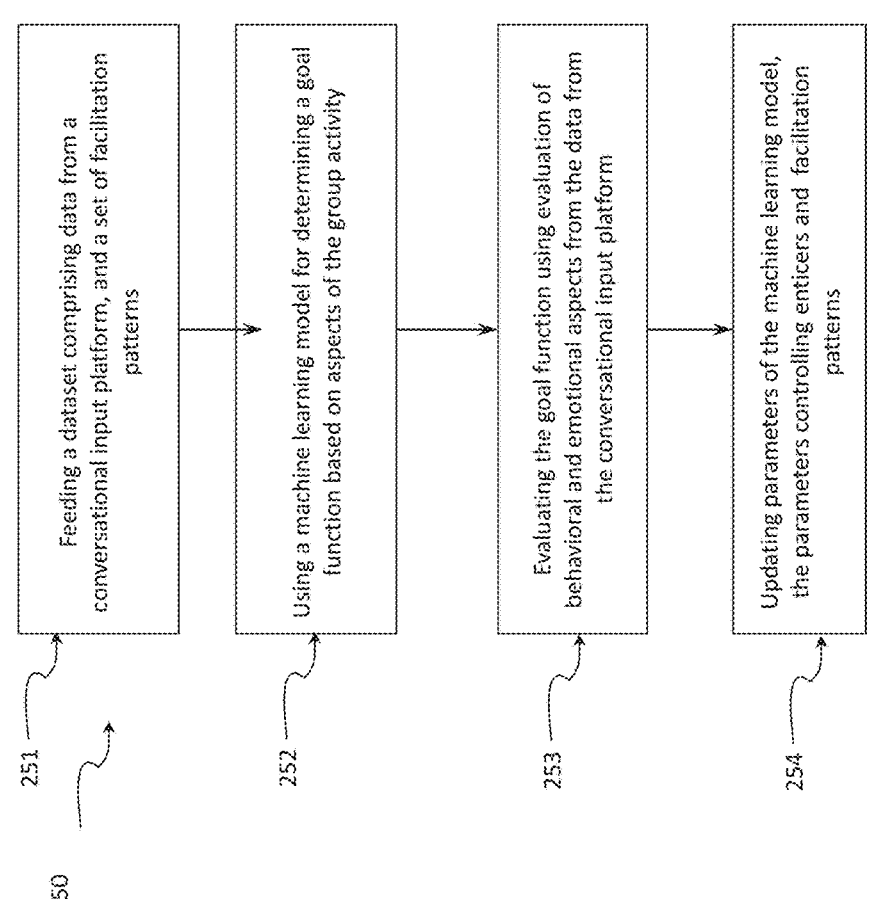

251 — Feeding a dataset comprising data from a conversational input platform, and a set of facilitation patterns 252 — Using a machine learning model for determining a goal function based on aspects of the group activity 253 — Evaluating the goal function using evaluation of behavioral and emotional aspects from the data from the conversational input platform 254 — Updating parameters of the machine learning model, the parameters controlling enticers and facilitation patterns

201 — Acquiring behavioral and emotional aspects of the plurality of users

202 — Analyzing the aspects using a machine learning model

203 — Detecting an enticer

204 — Performing facilitation patterns, addressing one or more users

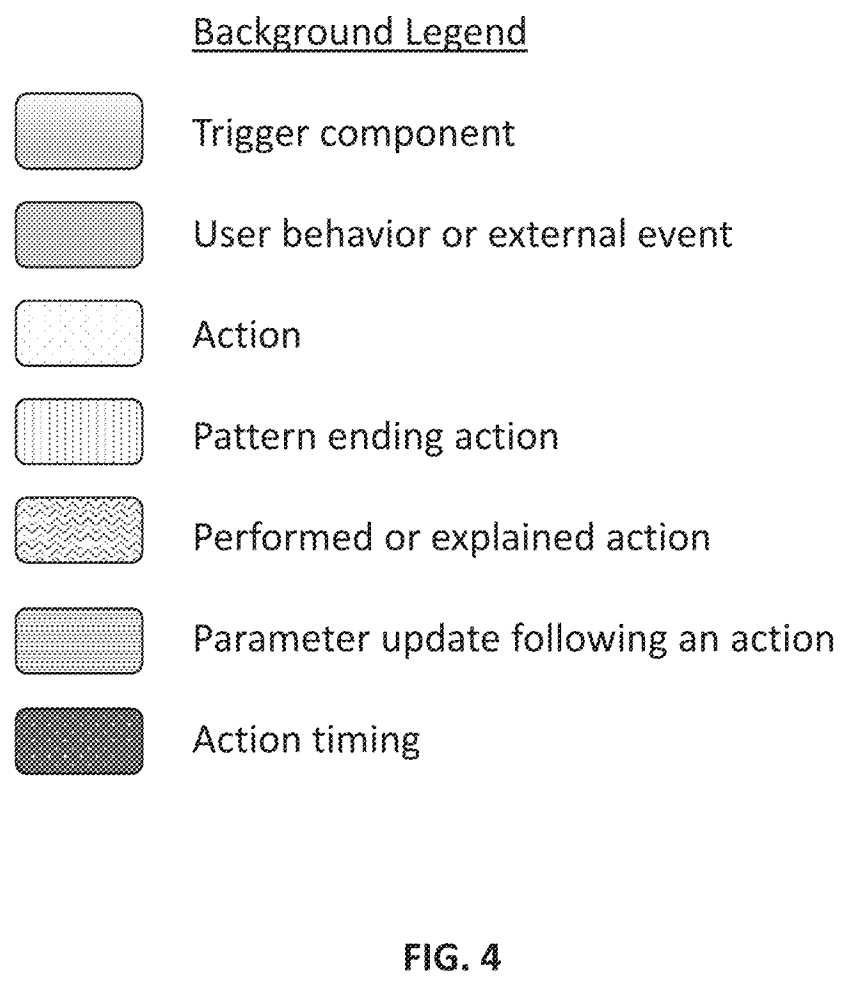

Background Legend

Trigger component

User behavior or external event

Action

Pattern ending action

Performed or explained action

Parameter update following an action

Action timing

FIG. 4

Triggers based on user behavior

Behavior based facilitation patterns

Behavior based facilitation pattern flows

Behavior and trigger based flows

Behavior directing flows and
facilitation patterns

Facilitation pattern flows

CONTENT-DRIVEN VIRTUAL AGENT FACILITATOR FOR ONLINE GROUP ACTIVITY

RELATED APPLICATIONS

This application is a National Phase of PCT Patent Application No. PCT/IL2022/050459 having International filing date of May 3, 2022, which claims the benefit of priority under 35 USC § 119(e) of U.S. Provisional Patent Application No. 63/183,681 filed on May 4, 2021. The contents of the above applications are all incorporated by reference as if fully set forth herein in their entirety.

FIELD AND BACKGROUND OF THE DISCLOSURE

The present disclosure, in some embodiments thereof, relates to automatic generation of gestures, and, more particularly, but not exclusively, to applying a virtual agent for generating gestures for facilitation of a group activities.

In the education system, both primary, secondary and higher education, learning in peer groups becomes the preferred and most efficient learning style. In higher education and the job market, the appearance of on-line courses has shown that hybrid learning that involves peer groups discussions on individual learning via on-line material results in highest learning gains. In primary and secondary schools, due to large pupil/teacher ratio, learning is performed in small groups, wherein the teacher either invests in one or two groups, or roams between groups; both options results in most children not getting personal treatment and attention.

These limitations also apply to other settings, including training workshops, recreational group activities, social skills and psychodynamic groups, marketing focus groups, and/or the like.

Due the COVID19 pandemic, the situation has worsened, where large online classes are much more challenging to manage and maintain, and small groups, while still a preferred option, are a problematic option.

Robotic agents, such as physical android robots, and virtual agents are known, however lack the knowledge how to effectively teach and/or conduct group activity. Therefore, group facilitation depends on trained human agents such as teachers, lecturers, managers, group therapists, and investigators.

SUMMARY OF THE DISCLOSURE

It is an object of this disclosure to provide a system and a method for training and applying a virtual agent for generating gestures and patterns thereof, for conducting group activities, using a machine learning model and represented knowledge as an initial method.

According to some embodiments of the disclosure, there is provided a computer implemented method of implementing and optimizing a virtual agent for conducting a group activity, the group comprises a plurality of users, the virtual agent comprising a conversational output platform, and the computer implemented method comprising:

using a conversational input platform for acquiring at least one behavioral or emotional aspect of the plurality of users;

analyzing the at least one aspect, using a machine learning model;

when at least one facet of the at least one aspect, pertaining to at least one user, is matched with an enticer of at least one facilitation pattern, performing the at least one facilitation pattern, addressing the at least one user, using the conversational output platform.

According to some embodiments of the disclosure, there is provided a system for implementing and optimizing a virtual agent for conducting a group activity, the group comprises a plurality of users, the virtual agent comprising a conversational output platform, and the system is configured for:

using a conversational input platform for acquiring at least one behavioral or emotional aspect of the plurality of users;

analyzing the at least one aspect, using a machine learning model;

when at least one facet of the at least one aspect, pertaining to at least one user, is matched with an enticer of at least one facilitation pattern, performing the at least one facilitation pattern, addressing the at least one user, using the conversational output platform.

According to some embodiments of the disclosure, there is provided a computer implemented method of training a virtual agent for conducting a group activity, the group comprises a plurality of users, the virtual agent comprising a conversational output platform, and the computer implemented method comprising:

feeding a dataset comprising data from a conversational input platform, and a set of facilitation patterns;

using a machine learning model for determining a goal function based on at least one aspect of the group activity, observed through the conversational input platform;

evaluating the goal function using evaluation of at least one aspect from at least one segment of the data from the conversational input platform; and updating parameters of the machine learning model, the parameters controlling at least one facilitation pattern from the set of facilitation patterns.

Optionally, the at least one aspect is a behavioral or emotional aspect of the plurality of users.

Optionally, further comprising applying a proposed facilitation pattern on a plurality of users, acquiring at least one behavioral or emotional aspect of the plurality of users using the conversational input platform, evaluating the goal function using evaluation of at least one aspect from the conversational input platform, and updating parameters of the machine learning model, the parameters controlling the proposed facilitation pattern.

Optionally, the goal function comprises a function of the emotional content of the group.

Optionally, wherein the goal function comprises a function of the plurality of users' participation in a discussion facilitated for the group.

The computer implemented method of claim 1, further comprising updating the model according to rules corresponding to at least one following behavior or emotional aspect of the plurality of users.

Optionally, further comprising personalizing the at least one facilitation pattern addressing the at least one user, using the facet pertaining to the at least one user of the at least one following behavior or emotional aspect of the plurality of users.

Optionally, wherein at least one behavior pattern is whether a phrase complies with one or more elements of training material.

Optionally, further forwarding recommendations comprising the at least one behavior aspect of a user, and a proposed response to a human agent.

Optionally, further comprising collecting at least one following behavior aspect of a user in response to the at least one facilitation pattern, for use in further training of the model.

Optionally, further comprising comparing the facets of at least one behavior aspect, pertaining to the plurality of users, and applying an additional facilitation pattern chosen on accordance to the comparing.

Optionally, wherein the facets are related to the participation time as a speaker in the group activity and the facilitation pattern is intended to promote evenness of participation.

Optionally, wherein the at least one facet is related to expression of an emotion, and the at least one facilitation pattern is intended to help a user manage the emotion.

Optionally, wherein the conversational input platform is multimodal sensor, comprising audio and video sensors for interacting with the group.

Optionally, wherein the at least one aspect is a preset behavior pattern from a set including little interaction, excessive interaction, and negative response.

Optionally, wherein at least one facilitation pattern comprises verbally addressing the least-participating user.

Optionally, wherein at least one facilitation pattern comprises verbally suggesting another point of view for a discussion facilitated for the group.

Optionally, wherein at least one facilitation pattern comprises displaying a face resembling feature gazing at a specific user.

Optionally, wherein at least one facilitation pattern is selected from a group consisting of comprises verbally addressing the least-participating user, verbally suggesting another point of view for a discussion facilitated for the group, displaying a face resembling feature gazing at a specific user.

Optionally, wherein the machine learning model was trained using a preset knowledge base, comprising preset behavior and emotional patterns and at least one facilitation pattern.

Optionally, further comprising updating the model by recommendations based on processing at least one behavior aspect of at least one of plurality of users by time-series clustering.

Unless otherwise defined, all technical and/or scientific terms used herein have the same meaning as commonly understood by one of ordinary skill in the art to which the disclosure pertains. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the disclosure can involve performing or completing selected tasks manually, automatically, or a combination thereof. Moreover, according to actual instrumentation and equipment of embodiments of the method and/or system of the disclosure, several selected tasks could be implemented by hardware, by software or by firmware or by a combination thereof using an operating system.

For example, hardware for performing selected tasks according to embodiments of the disclosure could be implemented as a chip or a circuit. As software, selected tasks according to embodiments of the disclosure could be implemented as a plurality of software instructions being executed by a computer using any suitable operating system. In an exemplary embodiment of the disclosure, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the disclosure are herein described, by way of example only, with reference to the accompanying drawings and formulae. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure be practiced.

In the drawings:

FIG. 2A is a flowchart of an exemplary process for group interaction facilitation, according to some embodiments of the present disclosure;

FIG. 2B is a basic flow chart of a first exemplary process for training a for group interaction facilitation, according to some embodiments of the disclosure;

FIG. 4 is a legend for facilitation pattern components, according to some embodiments of the present disclosure;

Figure 14:
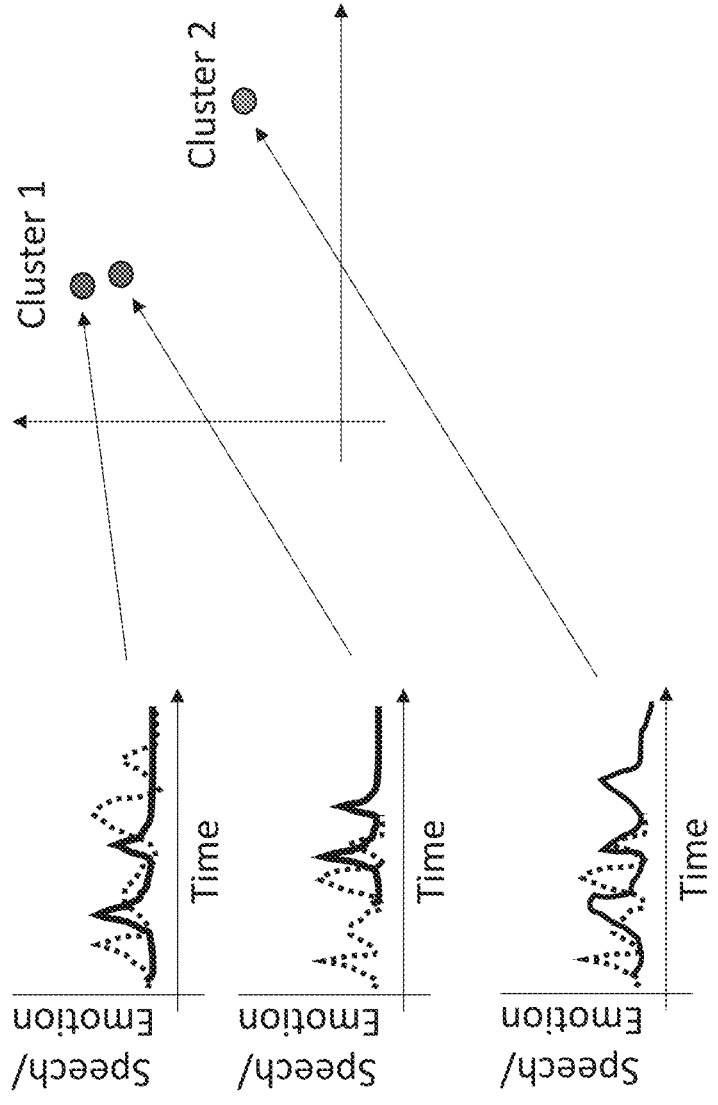
Figure 15:
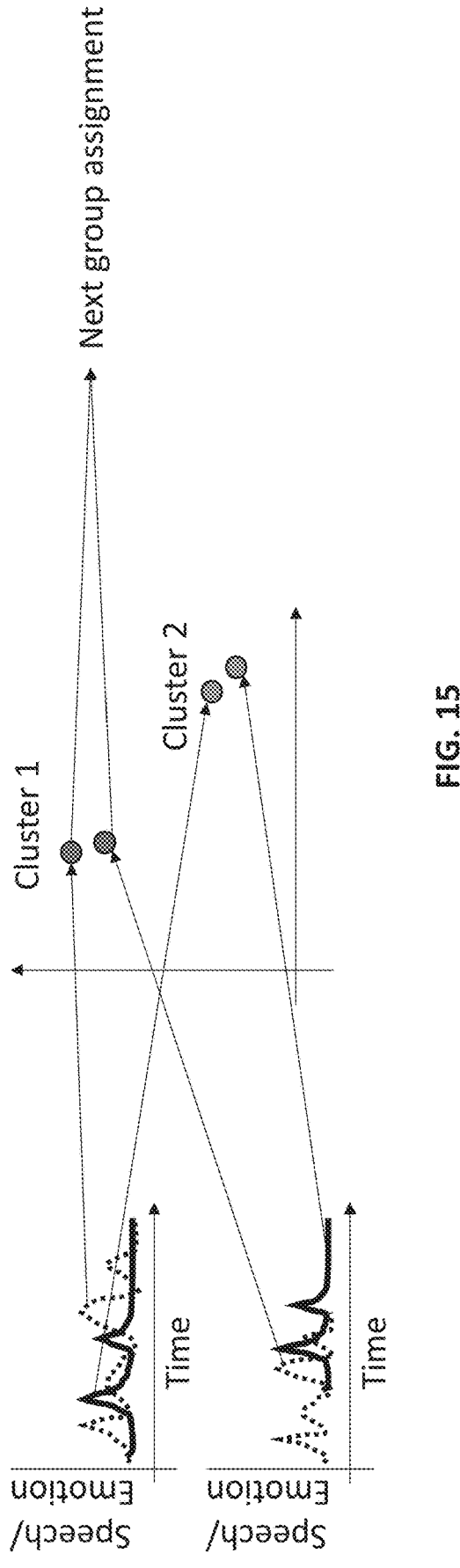

FIG. 14, which is an exemplary Time-series clustering of the group dynamics, according to some embodiments of the present disclosure; and FIG. 15 is an exemplary Time-series clustering of individual dynamics, according to some embodiments of the present disclosure.

DESCRIPTION OF SPECIFIC EMBODIMENTS OF THE DISCLOSURE

The present disclosure, in some embodiments thereof, relates to automatic generation of gestures, and, more particularly, but not exclusively, to applying a virtual agent for generating gestures for facilitation of a group activities.

The present disclosure is of a virtual agent system, which may run on one or more computers, communicate using the internet, be implemented in a robotic system, and/or the like. The virtual agent is apt for group activity control, such as learning and discussion, while enhancing the effectivity of the activity by maintaining effective group dynamics, for example by maintaining a positive atmosphere and equitable participation.

The disclosure is of computer based controller for group activities, which may be referred to as a virtual Robot Facilitator, or vRobotator, and may be implemented as a system for facilitation of group activities. The system may be particularly effective for small groups, of up to ten people, but may be used for larger groups. The virtual robot, or avatar, may generate and perform gestures and patterns thereof, calculated using a machine learning model. Thereby, the system may facilitate the discussion, teach the material, personalize the curriculum for each individual and group and perform according to best known practices of group facilitation, potentially improve thereon using reinforcement learning, online learning, and/or the like. The conversational platform may be a website that incorporates videoconferencing activity, a facilitating avatar and/or a panel for content presentation and interaction. The platform may also enable facial expression and speaker recognition in real time and adjust its behavior so as to optimize the social climate within the group.

The system may comprise of several parts: (i) A dedicated website and system for experts to insert the teaching content, e.g. history, physics, etc.; (ii) a database of group facilitation rules; (iii) an interface for the users that includes a videoconferencing API, e.g. Zoom, an Avatar API, e.g. Sitepal, and a dedicated space for content presentation; (iv) perception algorithms that process facial expressions and speech in real time and; (v) a system that integrates the content from (i) group facilitation rules from (ii) and perception from (iv) to perform a content-drive interactive group facilitation by the avatar, presented on the interface (iii).

The system may receive and apply multimodal input, from the conversational input interface, comprising video and sound to monitor certain aspects of the group dynamics and their facets, pertaining to the users. Optionally other factors may be monitored, such as users hear rate, temperature, infrared readings, and the like.

Some factors, aspects and facets monitored, may trigger facilitation patterns, which may be performed using the multimodal output of the conversational output interface.

The system may use a set of preset behavior, emotional patterns and facilitation patterns. The agent may be trained using a dataset of recorded group activities and machine learning algorithms, and may apply online learning for optimization and personalization of the facilitation patterns and the associated enticers. As used herein, the term enticer refers to generalized triggers, which may be modified by the machine learning model, for example for experimentation or when they appear to increase the group facilitation effectiveness. The enticers may or may not match a trigger defined by an expert. Similarly, facilitation patterns may be modified as the machine learning model accumulates data, and deviates form the original schemes.

The machine learning model may use algorithms such as a neural network adapted for online learning and/or reinforcement learning such as Deep Q-Network (DQN), Double DQN (DDQN), Proximal Policy Optimization (PPO), and/or the like, however other architectures may be used, including random fields, random forests, and/or the like.

Before explaining at least one embodiment of the disclosure in detail, it is to be understood that the disclosure is not necessarily limited in its application to the details of instructions and the arrangement of the components and/or methods set forth in the following description and/or illustrated in the drawings and/or the Examples. The disclosure is capable of other embodiments or of being practiced or carried out in various ways.

Figure 1:
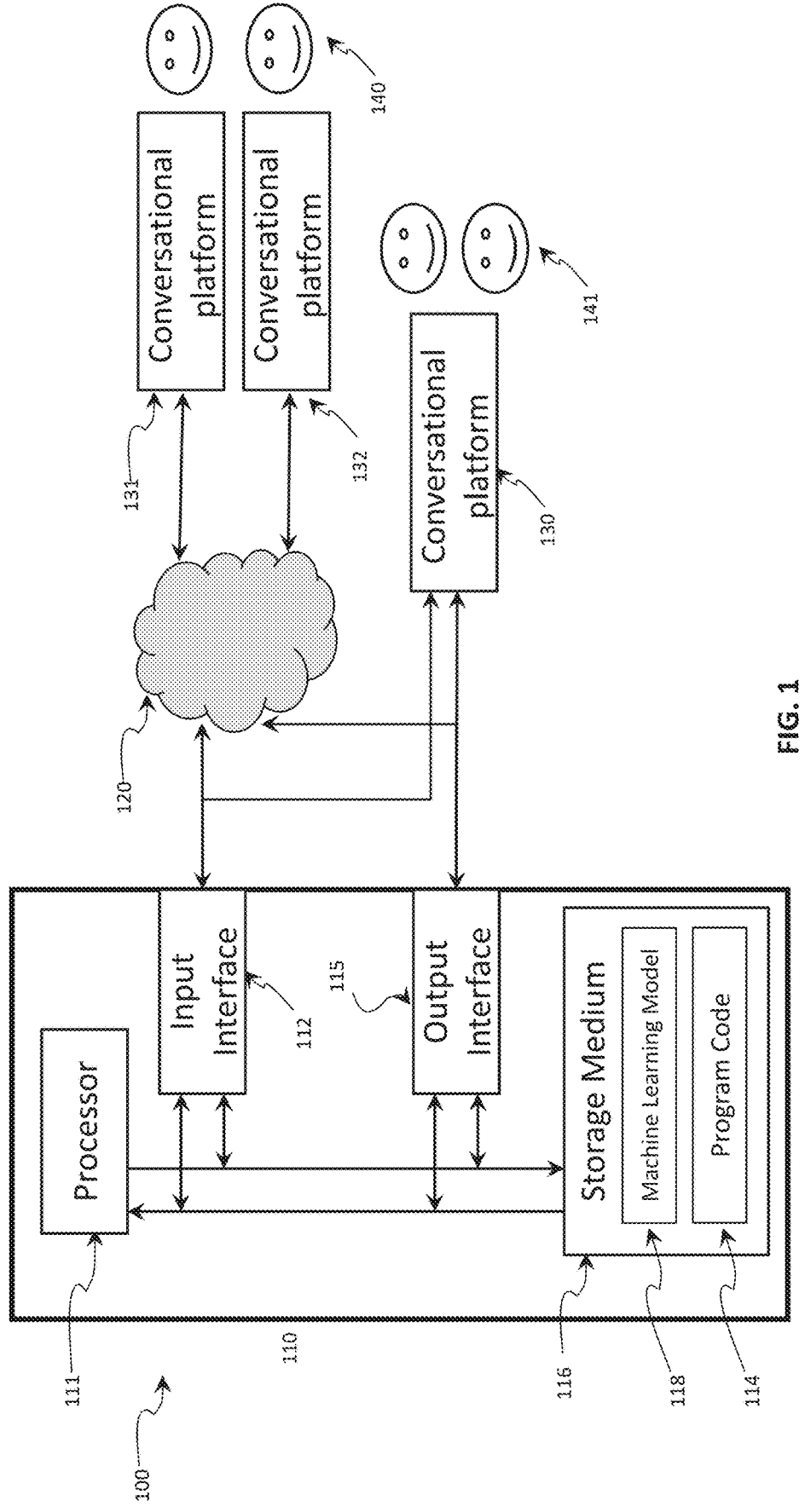
FIG. 1 is a schematic illustration of an exemplary system for group interaction facilitation, according to some embodiments of the disclosure present disclosure.

Referring now to the drawings, FIG. 1 is a schematic illustration of an exemplary system for group interaction facilitation, according to some embodiments of the present disclosure. An exemplary system for group interaction control 100 may execute processes such as 200 and/or 250 for using a system for group interaction facilitation, and/or training the system for group interaction control respectively. Further details about these exemplary processes follow as FIG. 2A and FIG. 2B are described.

The system may be a computer implemented system, and perform a method of providing and optimizing a virtual agent for conducting a group activity, wherein the group may comprise both collocated users and users connected using a communication system such as the internet, either due to distance or concern of pandemics such as covid-19.

The system for group interaction control 110 may include an input interface 112, an output interface 115, one or more processors 111 for executing processes such as 200 and/or 250, and storage 116 for storing code (program code storage 114) and/or data. The system for group interaction control may be physically located on a site, in a computer, a part thereof, or in a stationary robot facility, implemented on a mobile device such as an android robot, implemented as a distributed system, implemented virtually on a cloud service, on machines also used for other functions, and/or by several options combined. Alternatively, the system, or parts thereof, may be implemented using dedicated hardware, FPGA and/or the likes. Further alternatively, the system, or parts thereof, may be implemented on a server, a computer farm, the cloud, and/or the likes.

The input interface 112, and the output interface 115 may comprise one or more wired and/or wireless network interfaces for connecting to one or more networks, for example, a local area network (LAN), a wide area network (WAN), a metropolitan area network (MAN), a cellular network, the internet and/or the like. The input interface 112, and the output interface 115 may further include one or more wired and/or wireless interconnection interfaces, for example, a universal serial bus (USB) interface, a serial port, and/or the like. Furthermore, the output interface 115 may include one or more wireless interfaces for group interaction facilitation, and the input interface 112, may include one or more wireless interfaces for receiving information from one or more devices. Additionally, the input interface 112 may include specific means for communication giving rise to one or more conversational platforms such as 130,131, and 132. A conversational platform may interact with a single user such as 140, or multiple users such as 141. A group may comprise users interacting with the same, or with different conversational platforms. Each conversational platform comprises a conversational input platform communicating with 112 and a conversational output platform communicating with the output interface 115.

The conversational input platform may be a multimodal sensor, comprising audio and video sensors for interacting with the group, and comprise one or more sensor devices such as a camera, an infrared camera, a microphone and/or the like, and may acquire behavioral or emotional aspect of the users connected thereby. Similarly, the output interface 115 may include specific means for communication with one or more display devices 125 giving rise to a conversational output platform. The conversational output platform may comprise devices such as one or more robotic arms, loudspeakers, display devices, which may be fixed or situated on a robotic arm, a rotary pedestal, or the like.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The conversational platforms may communicate directly through the input interface 112 and the output interface 115, or alternatively through the network, internet, or the cloud as shown in 120.

The one or more processors 111, homogenous or heterogeneous, may include one or more processing nodes arranged for parallel processing, as clusters and/or as one or more multi core one or more processors. The storage 116 may include one or more non-transitory persistent storage devices, for example, a hard drive, a Flash array and/or the like. The storage 116 may also include one or more volatile devices, for example, a random access memory (RAM) component and/or the like. The storage 116 may further include one or more network storage resources, for example, a storage server, a network attached storage (NAS), a network drive, and/or the like accessible via one or more networks through the input interface 112, and the output interface 115.

The storage may further store a machine learning model 118, which may comprise one or more random forests, neural networks, Markov random fields, and/or the like.

The one or more processors 111 may execute one or more software modules such as, for example, a process, a script, an application, an agent, a utility, a tool, an operating system (OS) and/or the like each comprising a plurality of program instructions stored in a non-transitory medium within the program code 114, which may reside on the storage medium

116. For example, the one or more processors 111 may execute a process, comprising inference or training of a system for group interaction control such as 200, 250 and/or the like.

Referring now to FIG. 2A, which is a flowchart of an exemplary process for group interaction facilitation, according to some embodiments of the present disclosure. The processor 111 may execute the exemplary process 200 for a variety of purposes involving facilitation of group activity such as training, brainstorming, marketing focus groups, and/or the like. Alternatively, the process 200 or parts thereof may be executing using a remote system, an auxiliary system, and/or the like.

The exemplary process 200 starts, as shown in 201, with acquiring behavioral and emotional aspects of the plurality of users. The behavioral and emotional aspects may be acquired through one or more of the conversational platforms, by means such as video, sound, infrared, motion sensing, and/or the like, and may comprise vocal and somatic cues. These aspects may be verbal, however nonverbal communication may also be monitored to follow emotional state of users, group dynamics, body language, and the like.

The exemplary process 200 continues, as shown in 202, with analyzing the aspects using a machine learning model. As sensors may provide sound waves, pixels, and the like, automatic recognition of cues require significant processing, which may be obtained by machine learning models. Furthermore, linking between cues such as a hand movement, or a verbal expression to desirable behavior may be complex, and require a machine learning model, a knowledge representation based mode, or a combination thereof.

The exemplary process 200 continues, as shown in 203, with detecting an enticer. In this stage, the system executing the process checks when at least one facet of the at least one aspect, pertaining to at least one user, is matched with an enticer of at least one facilitation pattern. An aspect may be for example the number of times the users speak, the duration of their speaking intervals, the correctness of what they state, the emotional subtext, and/or the like, wherein facets may relate to a specific user. An enticer may be detected using the machine learning model, based on the conversational input platform data. The enticer may be a knowledge representation based event, known to be likely to be best answered by a facilitation pattern. However, online learning methods such as reinforcement learning may be used to modify the enticer events, the facilitation patterns, the rules linking between the enticer events and facilitation patterns, and the like, to improve the automatic group facilitation effectiveness.

In addition, subsequently, as shown in 204, with performing facilitation patterns, addressing one or more users. The facilitation patterns may be performed using the conversational output interfaces, by expressing vocal, verbal or nonverbal cues, as well as somatic like cues using robotic arms, rotating the display, using a curved display and/or the like. The processor may combine knowledge representation based inferences, and/or machine learning models during the inference, during both usage, training, and online training.

Some facilitation patterns comprise updating parameters updating the model according to rules corresponding to at least one following behavior or emotional aspect of the plurality of users, Reference is also made to FIG. 2B which is a basic flow chart of a first exemplary process for training for group interaction facilitation, according to some embodiments of the present disclosure. The exemplary process 250 may be executed for training a system for executing one or more facilitation patterns based on enticers detected for group interaction facilitation, for example training, brainstorming, marketing focus groups, and/or the like. The process 250 may be executed by the one or more processors 111.

The exemplary process 250 may start, as shown in 251 Feeding a dataset comprising data from a conversational input platform, and a set of facilitation patterns through the input interface 112. In some examples, these records comprise recorded group sessions facilitated by a human or a robotic facilitator. There is an advantage for providing recorded sessions bearing similarity to the sessions types the system for group interaction control is intended to be used for, for example in audience type, local culture, session goals, setting, training material, and the likes, however different types of sessions may also be included to provide variety of alternative examples.

The data may also comprise knowledge representation, in a set of rules, decision trees, random fields, and/or the like.

Inferences made by one or more detection algorithms may interpret the cues obtained by the conversational input interfaces and suggest facilitation patterns matching the session goals, group dynamics and/or specific user's behavior.

The exemplary process 250 continues, as shown in 252 with using a machine learning model for determining a goal function based on aspects of the group activity.

The goal function may be a function, based on prediction of how well the cues obtained by the conversational input interfaces are interpreted, how well the suggested facilitation patterns help obtain the session goals, a measure of curiosity encouraging exploration of states little is known about, a function of the emotional content of the group, users' participation in a discussion controlled for the group, a measure of fairness, equitability, non-discrimination, and/ or the like.

The exemplary process 250 continues, as shown in 253 with evaluating the goal function using evaluation of behavioral and emotional aspects from the data from the conversational input platform. The evaluation may comprise a "what if" analysis, gradient calculations, genetic algorithms, and/or the likes to explore possible improvement of the facilitation pattern suggestions. In order to calculate gradients, the facilitation pattern recommendation may be continuous, assigning score, probability, or the like to each pattern.

The exemplary process 250 continues, as shown in 254 with updating parameters of the machine learning model, the parameters controlling enticers and facilitation patterns. The parameters may be updated according to a function of the gradient, learning rate, step size, momentum, and the likes, through genetic algorithms, using some random methods, and/or the like.

Furthermore online training may be used for personalizing facilitation patterns addressing the user, using one or more facets pertaining to the user. The machine learning model may explore various possibilities to better respond, according to at least one following behavior or emotional aspect of the user, as well as other users.

During online training, the system may collect behavior aspect of the users, periodically, in response to facilitation patterns, for use in further training of the model, or both.

Figure 3:
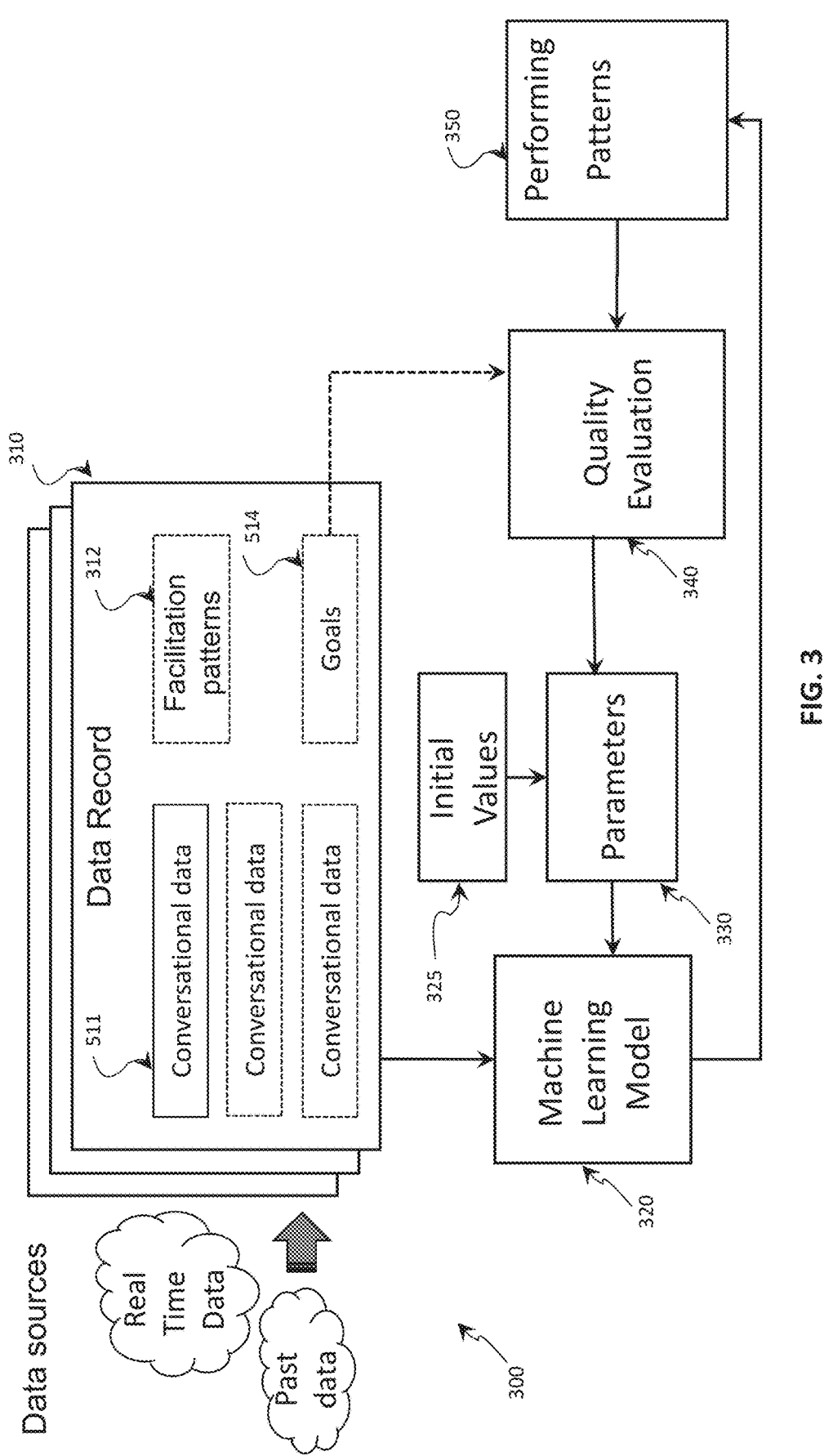
FIG. 3 is a diagram of an exemplary computer implemented method of training of a management system for group interaction control according to some embodiments of the present 20 disclosure.

Reference is also made to FIG. 3, which is a diagram of an exemplary computer implemented method of training of a management system for group interaction control according to some embodiments of the present disclosure. Some embodiments of the present disclosure apply a machine learning based model, trained using training data obtained from datasets, past sessions or current sessions.

In some implementation, a pre trained machine-learning model may be loaded to group interaction control system 110, determining the architecture of the machine learning model 320 and its parameters 330. In some implementations, the system 110 initializes the machine learning model, setting the parameters 330 to a random, pseudorandom, a knowledge representation based set of parameters, or some given set of initial values 325. The training may be controlled manually by operators and/or other professionals, or automatically, for example periodically, to further improve the expected effectiveness of future responses, or other success criteria. Inference can be applied on sample sessions for testing.

The training of the machine learning model 320 comprises receiving a plurality of conversational data records 311 based on relevant group activities, controlled by a human or a robotic facilitator. Data used for training may comprise facilitation patterns 312, for example, a sequence of hints aiming the group to answers compliant with the training material.

The training data may also comprise different goals 314, such as successful delivery of training material, group satisfaction and the like.

The machine learning based model 320, as initial condition and/or following reception of conversational data, may produce performing patterns 350 such as verbal expressions, gestures using display and/or robotic arms, and/or the like.

Training methods can comprise methods of supervised learning, where a scenario comprising information such as above together with a desirable goal 514 is matching a label annotated into the training set by trained professionals such as group facilitators, teachers, psychologists and/or the like. Additionally, simulation, or another machine learning or a neural network model, can be programmed or trained to provide quality evaluation 340 for responses suggested by the machine learning model.

Quality evaluation 340 validates and/or estimates the effectiveness of the performance patterns 350, and actions performed thereby, according to the machine learning model, and possibly using preset patterns represented in the initial values, in accordance with one or more goals and/or quality criteria. In some implementations, the quality evaluation 340 comprises another machine learning model, for example, a neural network, a Boltzmann machine, a decision tree, an SVM, a random field and/or a regression model. A quality criterion may be associated with users' positive mood, correct responses, equitable expression, and/or the like. The parameters 330 may be adjusted according to the goals, quality criteria, and the machine learning model output. Gradient descent is an example of an algorithm used from these parameter adjustments.

Reference is now made to FIG. 4, which is a legend for facilitation pattern components, according to some embodiments of the present disclosure.

Components having a color gradient background are trigger components. Trigger component, wherein the name assigned to the trigger is shown. An enticer event may be a trigger, however, the machine learning model may modify the trigger definition, to an event difficult to describe in a natural language, however the machine learning model is able to identify the enticer, and may produce accordingly a matching facilitation pattern. A trigger may be an emotion being expressed such as anger or fear, that certain time has elapsed, a user being dominant, silence extending over a threshold, a dance movement, a user standing up or sitting down, and/or the like.

Components having an even background are user behavior or external events. User behavior or external events are behaviors or occasions that are not initiated by the system, however the system may respond thereto.

A user behavior or external event may be for example an angry user, one or more users exceeding the activity time, a user considering purchasing a product, a surprising topic brought to discussion, an emergency call, and/or the like.

Components having a bright dotted background are actions, which may be components of one or more facilitation pattern. Saying a sentence, nodding using a display or a robotic pedestal, calling a human assistant, addressing a specific user, displaying an image, are examples of actions.

Components having a background with vertical lines are pattern ending actions, which indicate the end of a sequence of actions, and proceeding to the next pattern or activity. The pattern ending actions may be marked with "next".

Components having a horizontal zigzag background performed or explained actions, which may be more complex components of facilitation patterns. For example, explaining the advantages of a proposed product or action, explaining to a user that breaking into some else's speech is impolite, applying a break by telling a joke, addressing a random user, and/or the like.

Components having a background with horizontal lines are parameter updates following an action. Parameters may indicate that one or more users are dominant, or inclined to interrupt others, when was the last break, an estimation of a likelihood of a customer purchasing a product, and/or the like. This legend applies to the exemplary charts in FIG. 5 to FIG. 12.

Figure 5:
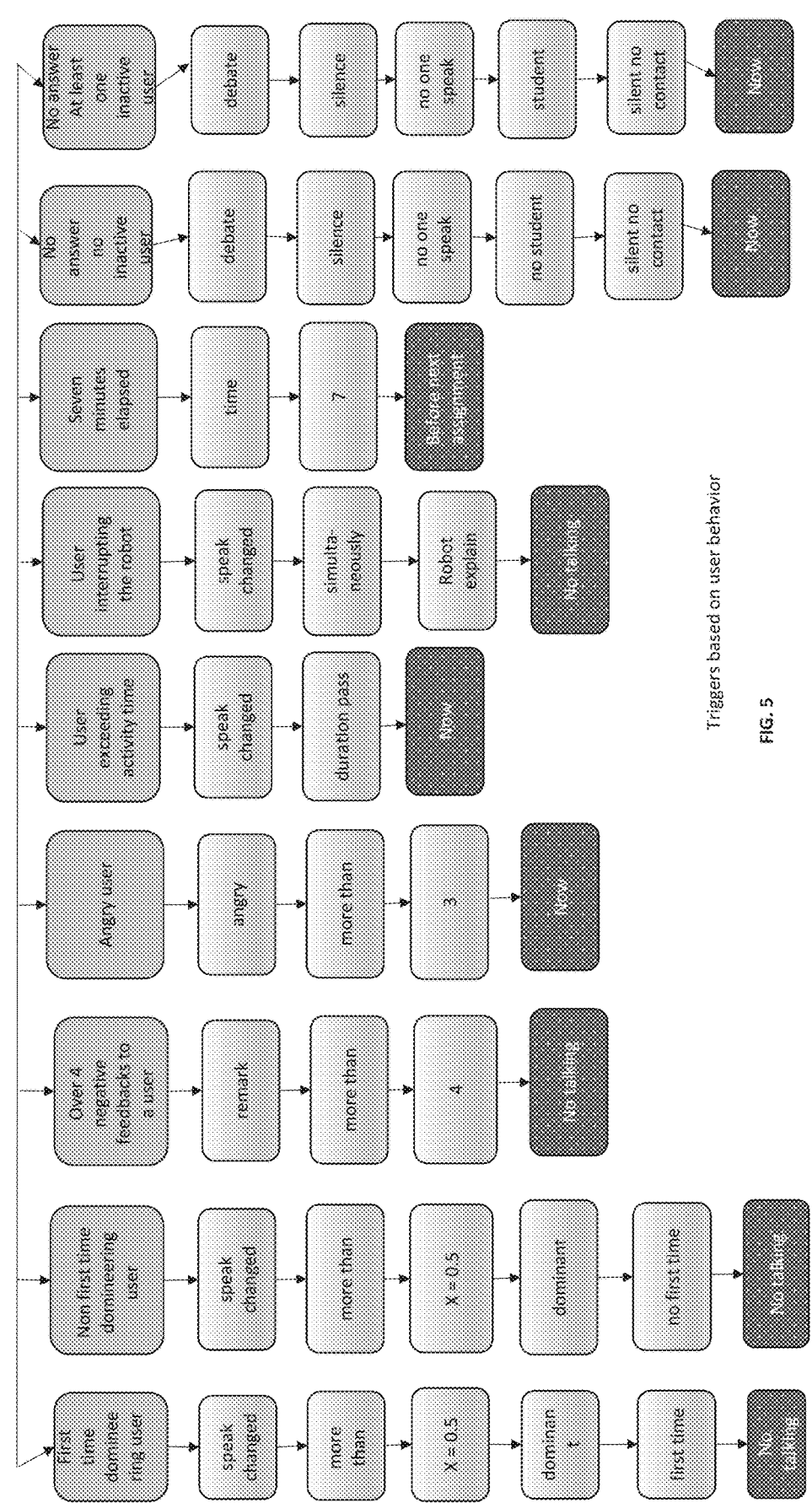
FIG. 5 is a trigger sequence chart, according to some embodiments of the present disclosure.

Components having a dark background with bright dots are action timings, for example now (immediate), before the next action or facilitation pattern, Reference is now made to FIG. 5, which is a trigger sequence chart, according to some embodiments of the present disclosure.

This figure shows some examples of trigger sequences. For example, if a user receives negative feedback more than four times, or detected to feel anger, or otherwise show negative responses, more than three times, or when a debate took place, silence followed, no one speaks, but everyone spoke at least once.

Figure 6:
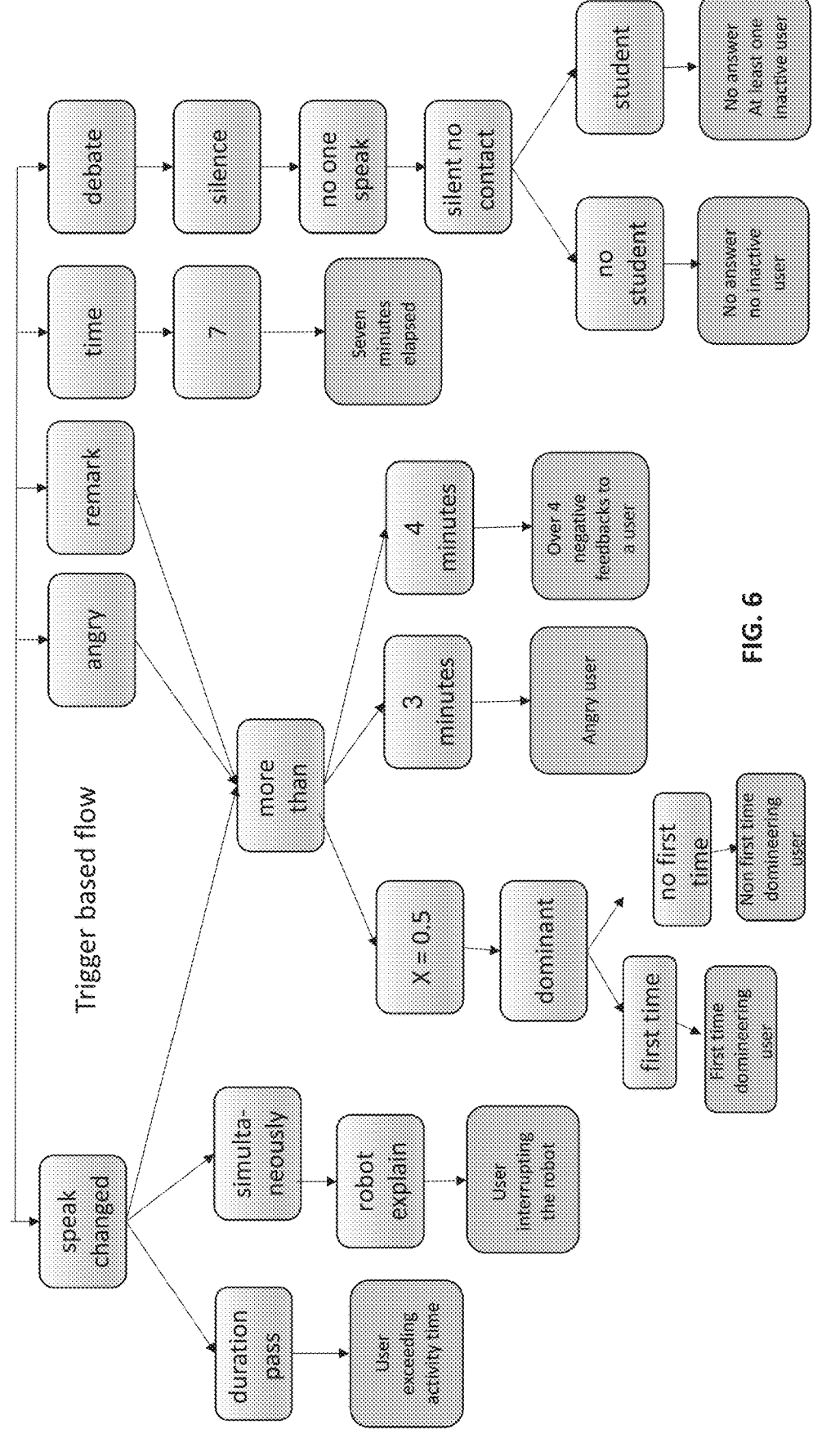
FIG. 6 is a trigger flowchart, according to some embodiments of the present disclosure.

Reference is now made to FIG. 6, which is a trigger flowchart, according to some embodiments of the present disclosure. This exemplary flowchart considers the triggers suggested in FIG. 5. First, five trigger components are considered: the speaker changed, a user is angry, a user stating a remark, certain time elapsed, and a debate is ongoing.

When a certain time duration passes before another speaker change, the enticer event, or in that case the trigger "User exceeding activity time" may be triggered, and a facilitation pattern may be performed. When another speaker starts simultaneously, or the users start speaking while the robot speaks, the robot may explain the behavior interrupts the activity, and "User interrupting the robot" may be triggered.

When the speaker who started speaking has done so over a certain part of the times, for example over 0.5 of the times, the user may be marked as dominant, showing excessive interaction, and the triggers, or enticers "First time domineering user" or "Non-first time domineering user" may be triggered, depending on the value of the parameter indicating whether the user was domineering before or not.

Similarly, if a user angry or uttering a remark, a parameter measuring the anger duration, or the remark number may be updated. When a user exceeds a certain time duration being angry, for example three minutes the "Angry user" event may be triggered. When a user receives over a number, for example four, negative feedbacks due to remarks, may trigger "Over 4 negative feedbacks to a user".

A time measure, for example seven minutes, may trigger the "seven minutes elapsed" event. Furthermore, when a debate is followed by silence, no one speaks or initiate any contact, the trigger may depend on factors such as whether there is at least one user, for example a student, who didn't take part in the debate. If there is, the event "No answer, At least one inactive user" may be triggered. Otherwise, the event "No answer, no inactive user" may be triggered.

Note that this is an exemplary flowchart, and other triggers may be used to base enticers on, either relating to educational settings, leisure settings, marketing activities, and/or the like.

Figure 7:
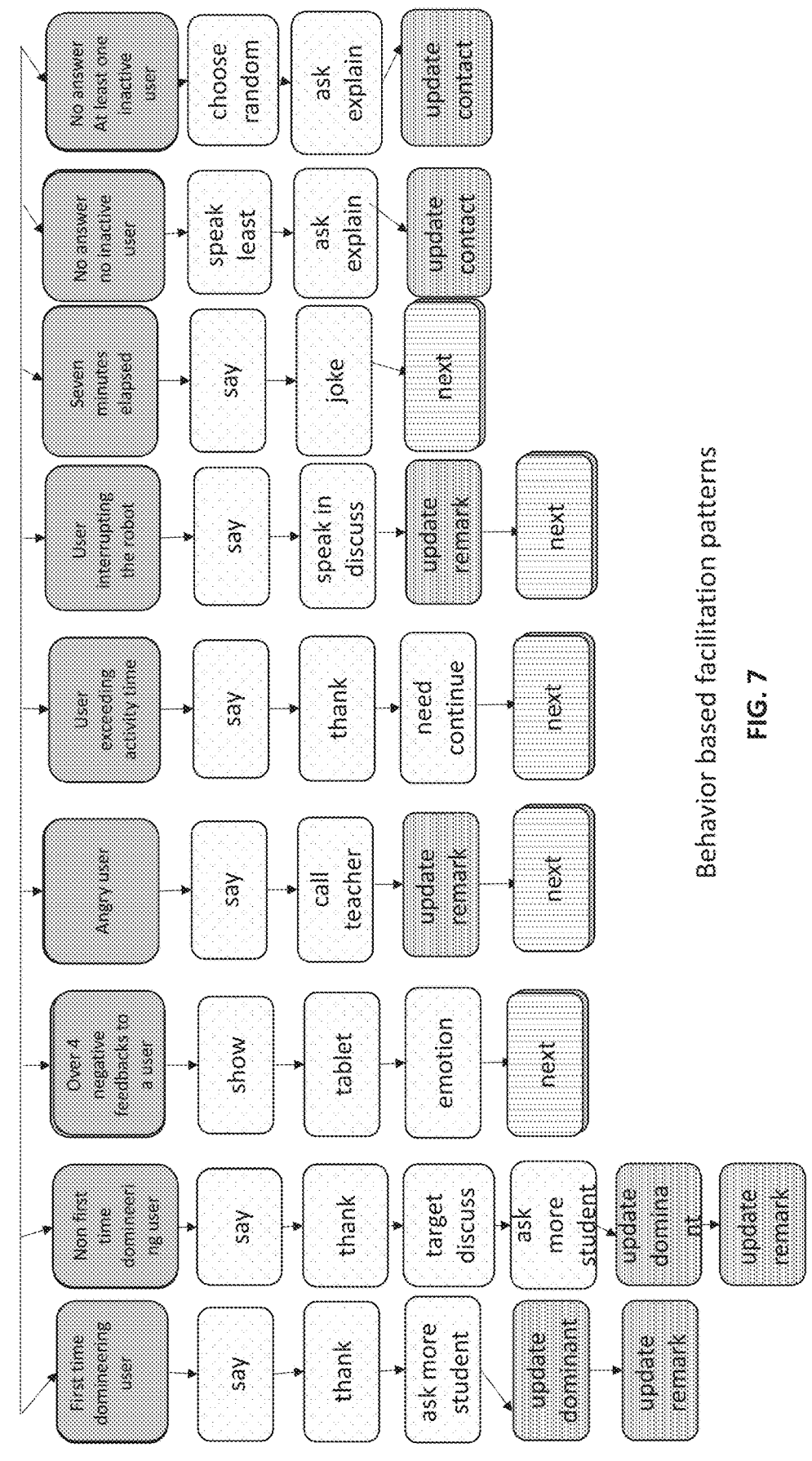
FIG. 7 is a facilitation pattern sequence chart, according to some embodiments of the present disclosure.
Figure 8:
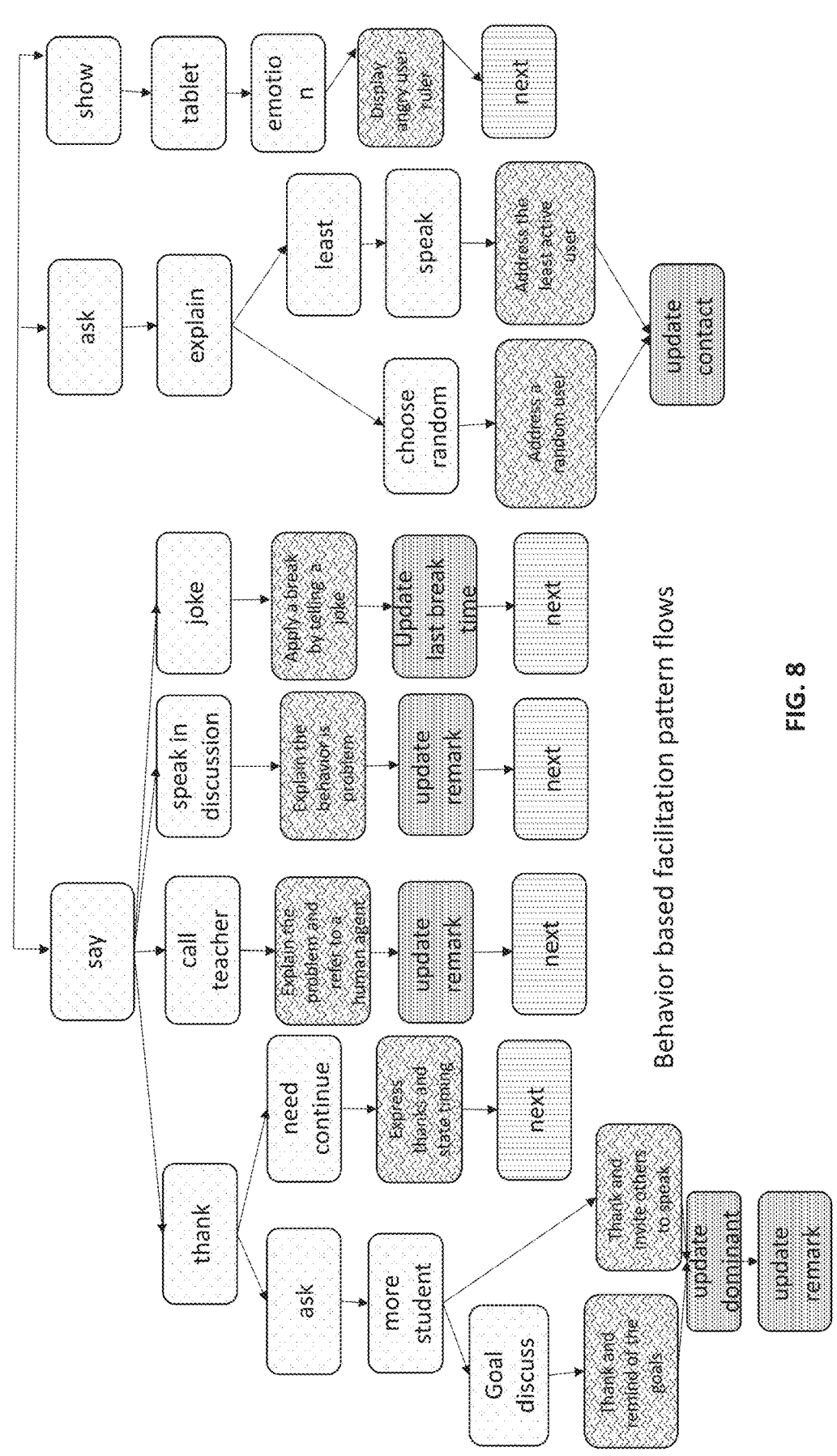
FIG. 8 is a facilitation pattern flowchart, according to some embodiments of the present disclosure.

Reference is now made to FIG. 7, which is a facilitation pattern sequence chart, according to some embodiments of the present disclosure.

This exemplary chart shows facilitation patterns targeted at triggers shown in FIG. 5 and FIG. 6, and may also be used for enticers based thereon, as is, or subject to modifications by the machine learning model or expert knowledge. For example, the facilitation pattern "Angry user" trigger may include saying something like "You appear angry, can you share what made you feel that?" and/or calling a human teacher, and updating a parameter indicating the user became angry. This is an example for updating the model according to rules corresponding to an emotional aspect of a user, as well as for a pattern wherein a facet is related to expression of an emotion, and the facilitation pattern is intended to help a user manage the emotion.

Similarly, the "First time domineering user" may trigger a facilitation patter, comprising saying "Would you let other voices in the debate", thanking the user for his opinion, addressing other users by asking a question, and updating parameters indication the user was domineering and received a remark. This is an example for updating the model according to rules corresponding to a behavioral aspect of a user Reference is now made to FIG. 8, which is a facilitation pattern flowchart, according to some embodiments of the present disclosure.

The first branch characterizing the facilitation patterns shown in the figure is whether they start by saying, asking or showing. For the showing case, for example, using a tablet which may be attached to a robotic arm of the conversational output interface, the emotion. The emotion may be expressed by a facial expression, or by a ruler, a bar chart or the like.

Asking may be directed to the group or a specific user. 'A specific user may be chosen randomly, or according to a measure, prioritizing users who spoke the least, or little interaction. Followingly, associated parameters may be updated.

Saying may comprise telling a joke, thereby applying a break. Followingly, a parameter indicating a joke break was made may be updated. Facilitation patterns may comprise relating to a user speaking in the discussion when the user should not have, for example by explaining that some behaviors are a problem. This may be followed by updating parameters indicating the user was addressed due to that.

Some facilitation patterns may comprise forwarding recommendations comprising the at least one behavior aspect of a user, and a proposed response to a human agent. A teacher, or another professional facilitator may be called, with an explanation about the problem, causing the system to refer to a human agent. A parameter indicating that a human agent was called may be updated.

Other patterns may comprise thanking a user, and either indicating the need to continue and stating timing, or query other users. In that case the discussion goals may be mentioned again to remind the users of these goals, and/or invite other users to speak. A parameter indication a user was dominant, and that the user received feedback about domineering may be updated. It should be noted these facilitation patterns are provided as example, and other facilitation patterns, directed at training, conduction of social games, marketing groups, team meeting management, and/or the like, may be used. It should also be noted that facilitation patterns may be modified by the machine learning model.

Figure 9:
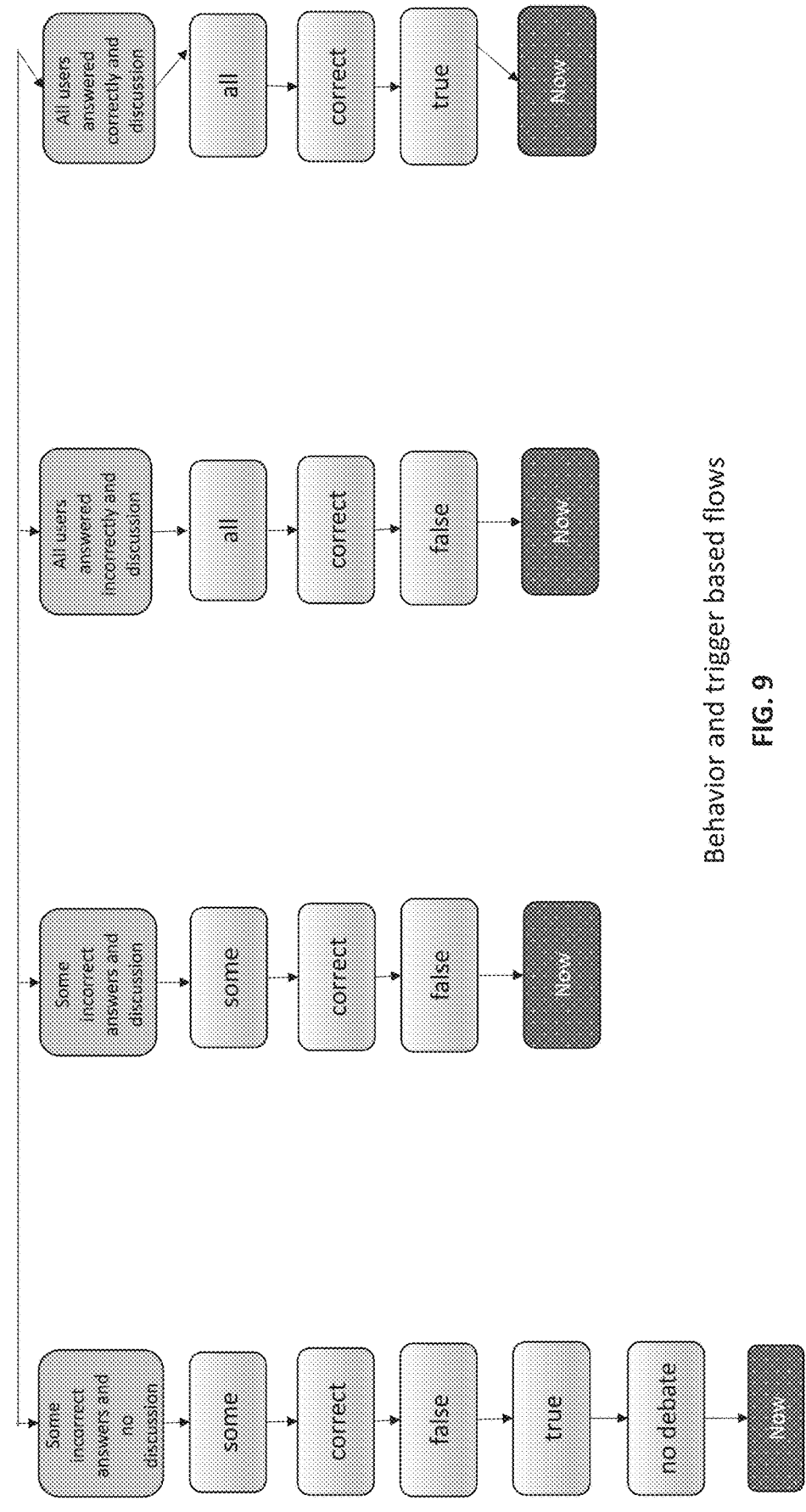
FIG. 9 is an additional trigger sequence chart, according to some embodiments of the present disclosure.

Reference is now made to FIG. 9, which is an additional trigger sequence chart, according to some embodiments of the present disclosure.

For example, when a discussion is going, some correct answers, wherein the phrase complies with one or more elements of training material, were expressed, however some incorrect answers were also presented by users in the group, the "Some incorrect answers and discussion" trigger may be activated. An enticer based on this trigger, however modified by the machine learning mode, may also be used. The "All users answered correctly and discussion" trigger may be valid when every user in the group spoke and provided a correct answer to the question raised. When the discussion ended and some answers were incorrect there is a different trigger, and yet another when all the answers were incorrect.

Figure 10:
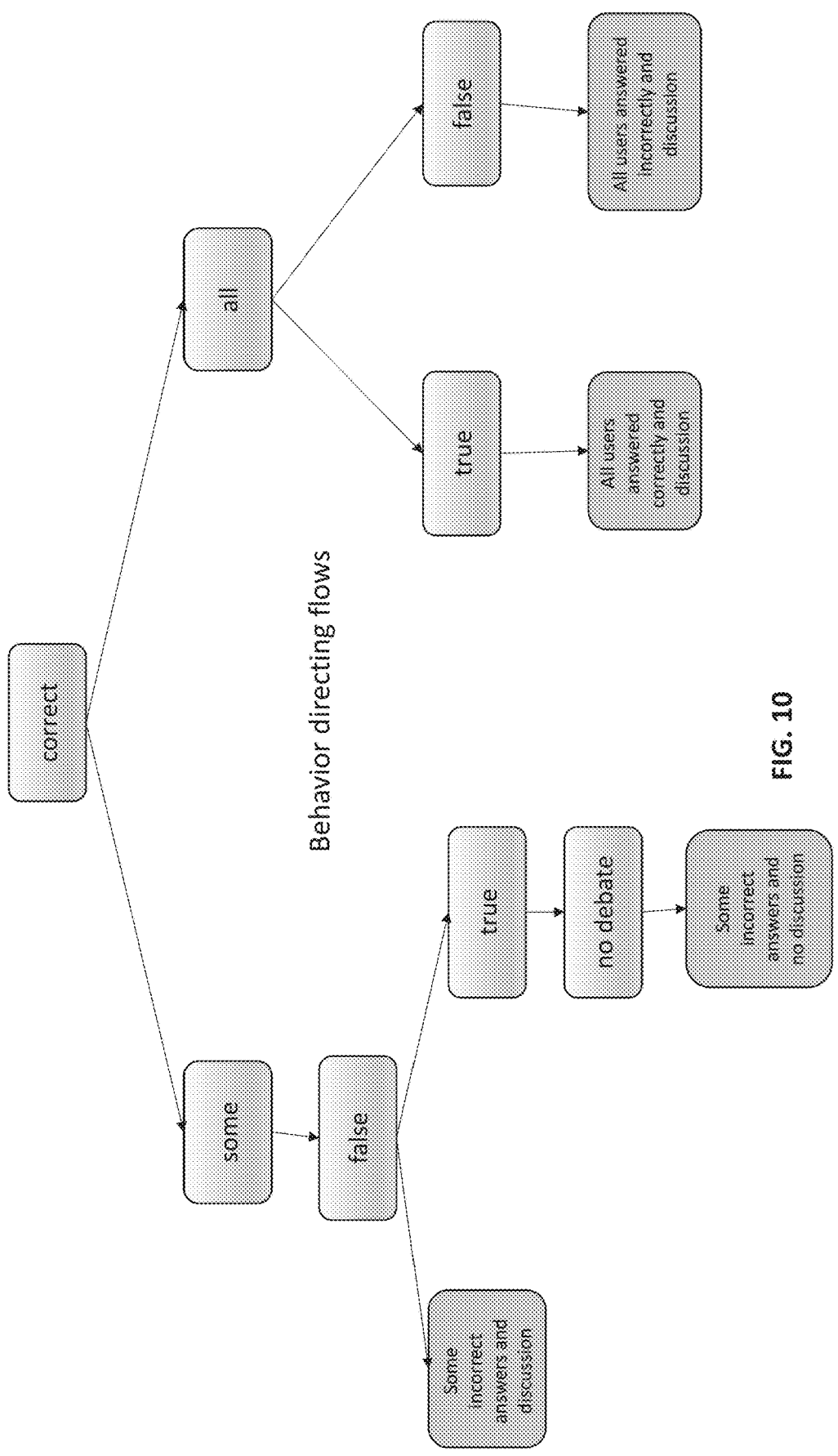
FIG. 10 is an additional trigger flowchart, according to some embodiments of the present disclosure.

Reference is now made to FIG. 10, which is an additional trigger flowchart, according to some embodiments of the present disclosure.

The first branch is whether all the users answered similarly during the discussion or not. If so, the trigger may be "All users answered correctly and discussion" or "All users answered incorrectly and discussion", depending on the answers' correctness.

When some answers are false and the discussion is on, the "Some incorrect answers and discussion" trigger may be invoked, and when the debates stops the "Some incorrect answers and no discussion" trigger may be invoked.

Figure 11:
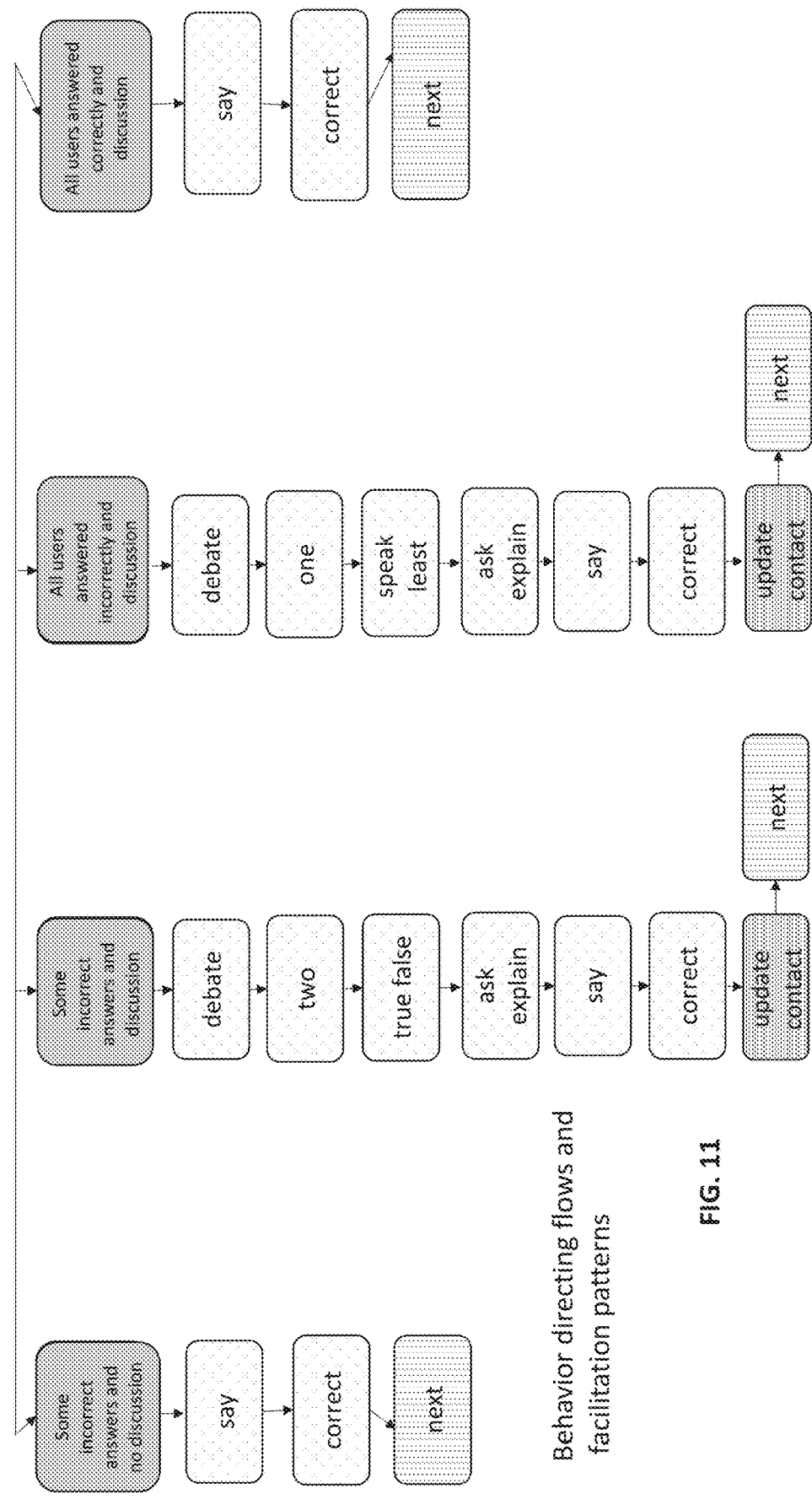
FIG. 11 is an additional facilitation pattern sequence chart, according to some embodiments of the present disclosure.

Reference is now made to FIG. 11, which is an additional facilitation pattern sequence chart, according to some embodiments of the present disclosure. For example, when some answers were incorrect and the discussion stopped, the system may use the conversational output platform to say the correct answers, and when the discussion is on and users answered incorrectly, to take part in the debate, ask a user, for example the user who spoke the least, to explain the answer, and provide feedback regarding the correct answer. This exemplary pattern comprises comparing the facets of a behavior aspect, pertaining to the plurality of users, and applying an additional facilitation patterns or parts thereof, chosen on accordance to the comparing. The least-participating user may be verbally addressed, by displaying a face resembling feature gazing at, by a gesture made by a robotic arm, or the like. When the least active user is addressed, the facet is related to the participation time as a speaker in the group activity and the facilitation pattern is intended to promote evenness of participation. The system may update one or more parameters to indicate the facilitation pattern was triggered and executed.

Figure 12:
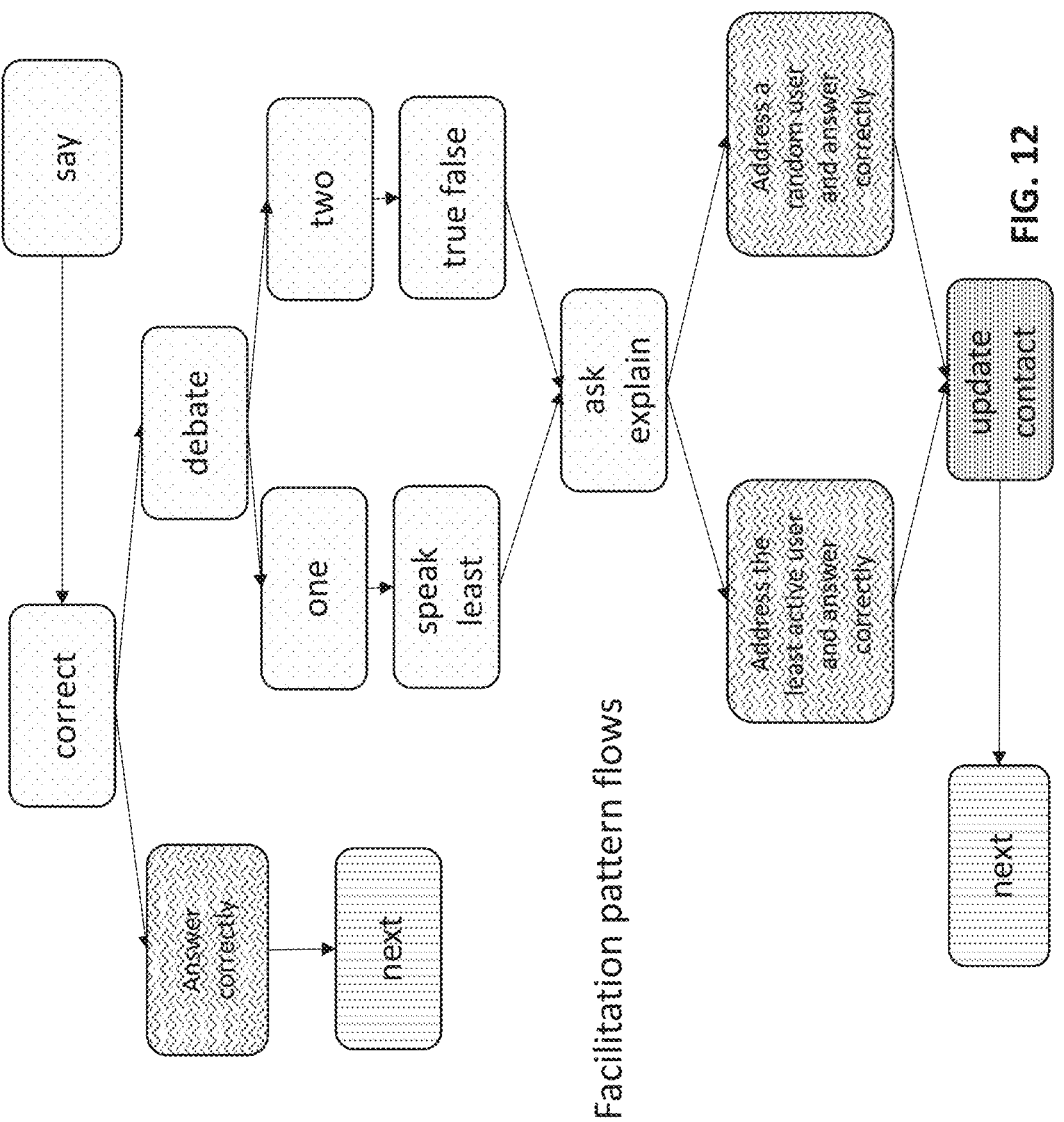
FIG. 12 is an additional facilitation pattern flowchart, according to some embodiments of the present disclosure.

Reference is now made to FIG. 12, which is an additional facilitation pattern flowchart, according to some embodiments of the present disclosure.

These flows may start by saying if the answers were correct, and state the correct answer when needed. This is an example of verbally suggesting another point of view for a discussion facilitated for the group. Furthermore, the facilitation patter may comprise opening a debate, either by querying the user who spoke the least, or by querying two users, one who answered correctly and another who answered incorrectly. The next component of the facilitation pattern may be asking for explanation, and followingly, either addressing the user who spoke the least and answer correctly, or address a random user and answer correctly. Followingly parameters maintained by the system may be updated, for statistics and future decisions.

Figure 13:
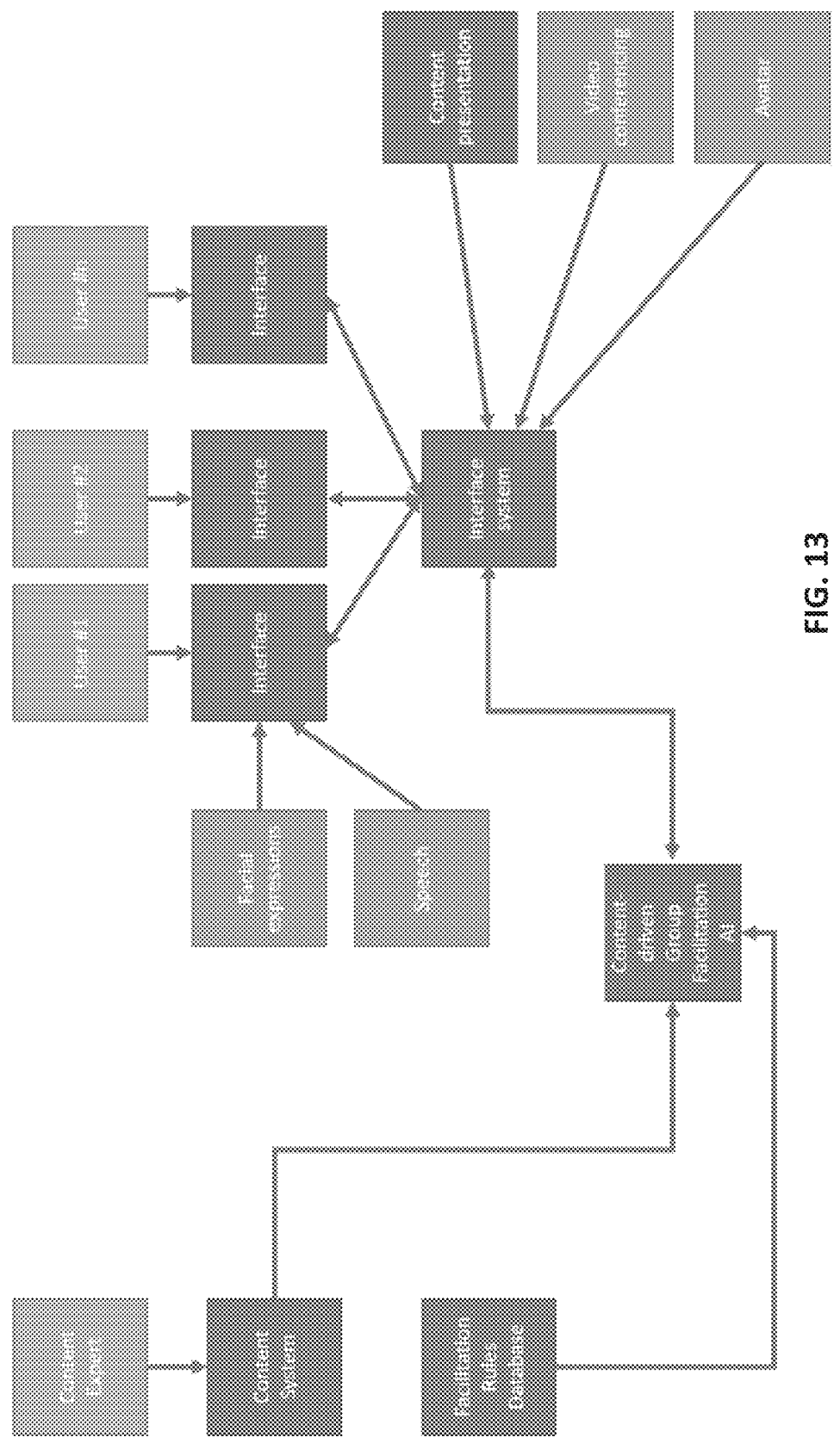
FIG. 13 is an information provision diagram, according to some embodiments of the present disclosure.

Reference is now made to FIG. 13, which is an information provision diagram, according to some embodiments of the present disclosure.

The disclosure environment enabling the system for group interaction control may be viewed as comprising four elements: A content system, a user interface, facilitation, or control rules database, and an AI integration system.

The content system may comprise an intuitive user interface for content expert, for examples, marketing experts, group managers, teachers, educators, and trainers. The system may enable the expert to enter the content, which may be a marketing content, or a lesson in subjects like history or physics, in an intuitive manner.

The content may comprise questions for the learners, e.g., multiple choice, ranking, and open questions. The content may also comprise content presentation, e.g., images, videos, texts, and explanation text for the avatar, given in free text.

The system may enable the insertion of activity blocks, wherein each block contains content presentation/questions and an avatar explanation.

The user interface includes may comprise four main parts: Avatar, videoconferencing, content section, and perceptual system.

The avatar may link to a 3rd-party API, e.g., Sitepal, which enables the presentation and embedding of a virtual agent into the website. The interface with the avatar includes selection of a scene (avatar character, background image, etc.), text-to-speech in certain languages, e.g., English, and audio files in other languages. The animations of the avatar come from the 3rd-party API.

The videoconferencing may also be a 3rd-party API, e.g., Zoom, that enables the interface with a video conferencing with the other users in the group activity. The interface enables initiating the video conferencing and presenting the other users within the website.

The content section may be a simple HTML5-based dynamic element that enables the presentation of various elements, based on the content supplied by the content system, e.g., buttons for multiple-choice questions, textboxes for open questions and/or the like.

The perceptual system may use 3rd-party APIs for facial expressions, e.g., face-API and speech detection. Thus, each user's facial expressions and their emotional content, e.g., happy, angry, as well as the volume and content of the speech are sent to the central system for further recording and analysis.

The facilitation rules database includes all the know-how of best practices of group facilitation. It includes both reactive social rules, e.g., if someone speaks too much, address him gently; reactive content rules, e.g., if one answers correctly and the other do not, the facilitator addresses both to explain themselves; generative rules, e.g., an introductory activity to set expectations; feedback rules, e.g., give positive feedback in a constructive way for someone who was silent and spoke for the first time.

This rules database is an integral and important part of the system, especially on first usage, and is written in such a way so as to enable insertion of new rules, as well as enable easy compilation into the AI system. A pseudo-code system may convert controlled language into a set of executable functions. The pseudo-code is based on triggers and actions scenarios:

Triggers may relate to: (i) the perceptual system, e.g., facial expressions and speech; (ii) time passing, e.g. 7 minutes have passed and (iii) the content section that includes interfaces for the users, e.g., buttons and textboxes.

Actions are related to components of facilitation patterns, for example: (i) the avatar speech and animations, e.g., say "right answer" and smile, and (ii) the content section, which may include new features, e.g., new buttons relating to the facilitation.

The actions and the triggers are an example of a preset knowledge base, comprising preset behavior and emotional patterns and at least one facilitation pattern, comprising one or more actions. The at least one facilitation pattern may be selected from examples such as "Amy, we'd like to hear what you think the asmwer is" when Amy speaks less than others, gazing at a silent student, hinting on the correct answer, telling a loke, and/or the like.

Examples of such code can be seen on figures, ranging from FIG. 5 to FIG. 12. It should be note that as the machine learning model learns to improve the facilitation effectivity, the triggers may develop to enticers, which may differ from the original content provided, and the facilitation patterns may also be modified.

Another example may comprise scripts such as the following: when there was a discussion and everyone answered incorrectly, choose the student who spoke the least and ask for an explanation. For example: "David, what did you answer and why did you answer that question?". A discussion and there is a student who answered correctly and a student who answered incorrectly may be responded by selection of 2 students, one who answered correctly and one who did not and a request for an explanation. For example "David, Yael, you answered contradictory answers and one of them is correct, please tell us what you answered and why?", When there is a discussion and there is no correctly defined answer to the question choosing the student who spoke the least and asking for an explanation. For example "David, what did you answer and why did you answer the question asked so?".

There may also be questions by the avatar that are questions of sharing for example experiences, and during a discussion the avatar may not turn to someone specific. A discussion where there is silence for five seconds, there is no student who spoke yet at all may be followed by addressing a random student or the student who spoke the least and ask for an explanation. For example: "David, what did you answer and why did you answer that question?". A general encouragement to speak may also be voice, displayed, or cued.

When one person is dramatically more engaged in the conversation than others, the comment introduced may be for example "I would love to hear what other students have answered. Who else is interested in sharing his answer?", or "David, thank you for contributing to the discussion, let's hear more students. Does anyone want to talk?"

When one person repeatedly takes over the conversation, an exemplary comment may be for example "David, thank you very much for the discussion. I would like to mention that the purpose of the discussion is to hear all the students, and therefore another student can participate. Who is interested in expressing his or her opinion?". Additionally, when a time limit is reached the comment may be "David, thank you very much for contributing to the discussion but we must continue to the next activity."

Positive feedback such as "David, well done, you answered correctly in this question. Keep it up!" may be given by the avatea to a participant.

Another exemplary alternative way to encode triggers, action, and the facilitation patterns based upon, is to define three characteristics, a name, a trigger, and an action. In the following examples' pseudocode, | indicates an argument. $ activation time, > next step and < an additional parameter update.

```
Name: 'If 7 of the time has passed'
Trigger: 'Time | 7 $ before new assignment"
Action: 'say | joke > next'
Name: 'If speak more than X for a student in the first time- dominant for first time'
Trigger: 'speak changed | more than | X | dominant | first time $ no talking'
Action: 'say | thank | ask more student > update dominant < update remark'
Name: 'If speak more than X for a student not in the first time- dominant not for first time'
Trigger: 'speak changed | more than | X | dominant | no first time $ no talking'
Action: 'say | thank | target discuss | ask more student > update dominant < update remark'
Name: 'If no one wants to answer and there is silent with contact=0 -ask silent'
Trigger: 'debate | silence | no one speak | student | silent no contact $ now'
Action: 'speak least lask explain > update contact'
Name: 'If no one wants to answer and there is no silent with contact=0) -ask no silent (random choice)'
Trigger: 'debate | silence | no one speak | no student | silent no contact $ now'
Action: 'choose random | ask explain > update contact'
Name: 'If a student speak now and we need to continue'
Trigger: 'speak changed | duration pass $ now'
Action: 'say | thank | need continue > next'
Name: 'If a student is angry more than 3 minutes' Trigger:
'angry | more than | 3 $ now' Action:
'show | tablet | emotion > next'
```

-continued

```
Name: 'If a student talk while the robot is talking'
Trigger: 'speak changed | simultaneously | robot explain $ no talking'
Action: 'say | speak in discuss > update remark > next'
Name: 'If the robot remark the student more than 4 times'
Trigger: 'remark | more than| 4 $ no talking'
Action: 'say | call teacher > next'
Name: 'default for no debate'
Trigger: some| correct | false | true | no debate $ now'
Action: 'say | correct > next'
Name: 'if all gave correct answers, say correct answer and move on'
Trigger: all | correct | true $ now'
Action: 'say | correct > next'
Name: 'if all gave wrong answers, ask someone to explain, say correct answer and move on'
Trigger: all | correct | false $ now'
Action: debate | one | speak least | ask explain > say | correct > update contact > next'
Name: 'if some gave wrong answers,ask 2 students to debate,say correct answer and move on'
Trigger: some | correct | false $ now'
Action: debate | two | true false | ask explain > say | correct > update contact > next'
Name: 'if there is a student who doesn't answer to the question in this section, ask to answer'
Trigger: 'question | student| not answer |time end $ now'
Action: 'ask answer'
Name: 'if there is a close question and all answers are correct, give positive feedback.'
Trigger: 'close question | all | correct answer | positive $ now'
Action: 'say | positive feedback | all correct'
Name: 'if there is a close question and all answers are correct, give neutral feedback.'
Trigger: 'close question | all | correct answer | neutral $ now'
Action: 'say | neutral feedback | all correct'
Name: 'if there is a close question and all answers are correct for x questions in a row, give
positive feedback.'
Trigger: 'close question | all | correct answer| x | times | in row $ now'
Action: 'say |positive feedback | all correct for x times'
Name: 'if there is a close question and all answers are correct in less than 15 seconds, give
positive feedback.'
Trigger: 'close question | all | correct answer| less than | 15 | positive $ now'
Action: 'say | positive feedback | all correct quickly'
Name: 'if there is a close question and all answers are correct in less than 15 seconds, give
neutral feedback.'
Trigger: 'close question | all | correct answer| less than | 15 | neutral $ now'
Action: 'say | neutral feedback | all correct quickly'
Name: 'if there is a close question and all answers are false, give negative feedback.'
Trigger: 'close question | all | false answer | negative$ now'
Action: 'say | negative feedback | all false'
Name: 'if there is a close question and all answers are false, give neutral feedback.'
Trigger: 'close question | all | false answer | neutral $ now'
Action: 'say | neutral feedback | all false'
Name: 'if there is a close question and all answers are false for x questions in a unit, give
negative feedback.'
Trigger: 'close question | all | false answer| x | times | in unit | negative $ now'
Action: 'say | negative feedback | all false for x times > ask | answer again'
Name: 'if there is a close question and all answers are false for x questions in a unit, give neu-
tral
feedback.'
Trigger: 'close question | all | false answer| x | times | in unit | neutral$ now'
Action: 'say | neutral feedback | all false for x times > show | last question'
Name: 'if there is a close question and all answers are false in less than 15 seconds, give
negative feedback.'
Trigger: 'close question | all | false answer| less than | 15 | negative $ now'
Action: 'say | negative feedback | all false quickly'
Name: 'if there is a close question and all answers are false in less than 15 seconds, give neutral
feedback.'
Trigger: 'close question | all | false answer| less than | 15 | neutral $ now'
Action: 'say | neutral feedback | all false quickly'
Name: 'if there is a close question and some answers are false, give neutral feedback.'
Trigger: 'close question | some| false answer $ now'
Action: 'say | neutral feedback | some false > next'
Name: 'if there is a close question and there is silent with the correct answer, ask say correct.'
Trigger: 'debate | close question | silent| correct answer $ now'
Action: 'ask|say correct answer'
Name: 'if there is a student who didn't receive positive feedback yet'
Trigger: 'debate done | student | no positive feedback| $ now'
Action: say| positive feedback|one student > next'
```

The AI integration system may integrate between all the aforementioned systems and may create a fluent content-driven group facilitation activity, using one or more machine learning models.

The AI integration system may integrate the content system, that includes the sections of the activity, based on the content, and send the interface the appropriate content to present at each time in the content section; it may instruct the avatar interface what it should say regarding the activity.

The AI integration system may integrate the facilitation rules database and the interface to create an active facilitation avatar. This may be based on the specific rules that apply at each time, which are based on the perceptual system, for example if someone is angry for too long, and on the content section, for example if someone pressed a multiple-choice button. The rules that apply may dictate what the avatar says, for example "why are you angry?", and what is displayed in the content section, for example two buttons "something at home", and "this activity is boring". It may then respond to the users' interaction via the content section or continued perception.

Reference is now made to FIG. 14, which is an exemplary Time-series clustering of the group dynamics, according to some embodiments of the present disclosure.

Time-series clustering of the group dynamics may enable updating the model by recommendations based on processing at least one behavior aspect of at least one of plurality of users by time-series clustering, and aggregating information from several groups to train the virtual robot facilitator model.

The system may include post-activity analysis of the group interaction in order to cluster, categorize and then recommend adaptations of facilitation patterns, associated enticers, and the like, for better performance of the following activities.

The data that the system may store during the interaction may include speech, emotion detection from speech and facial expressions, body movements, biometrics, and/or the like. The data for the post-activity analysis may be stored as tabular data, in the form of a time-series, and/or the like, representing the dynamics of the interaction of the group members as well as how they respond to the facilitation patterns, and the virtual robot facilitator in general.

When the data is analyzed as multi-dimensional time-series data, the system may categorize the group dynamics, for example by using time-series clustering, such as dynamic time warping. Using the time-series clustering, the group may be categorized to a specific cluster that characterize a type of dynamics within the group, for example a group that has many turn-taking, a silent group, a group with one person talking more than others, and the like, each represented by a cluster. The clustering may be general or associated with specific behavior aspect, pertaining to the plurality of users, forming the group. This categorization may be used for group personalization based on the cluster data. Using data collected from other groups in the same cluster, may enable a better, and more robust personalization, by adapting the virtual agent to manage the flow of the dynamics, for example by tuning enticer events for facilitation patterns. The time-series clustering may enable the aggregation of data from several different groups for better and faster learning and personalization.

Reference is now made to FIG. 15, which is an exemplary Time-series clustering of individual dynamics, according to some embodiments of the present disclosure.

Processing individual dynamics. May enable recommendation of future group composition assignments, based on processing at least one behavior aspect of at least one of plurality of users, for example by time-series clustering.

Another type of group dynamics and composition analysis may involve the recommendation of future group composition. Thus, for example, by analyzing the interaction between different people within the group, and having an automated time-series clustering of individual behavior facets, the system may recommend which people should be part of the next group. By learning which group composition, made up of specific types of people, as categorized by the automatic time-series clustering, may result in better and more effective discussions, the system may automatically recommend, from a pool of candidate people, which ones should be part of which group for maximal group discussion efficiency.

It is expected that during the life of a patent maturing from this application many relevant machine learning methods, robots, and the like will be developed and the scope of terms such as machine learning model, robot, and robotic, is intended to include all such new technologies a priori.

The terms "comprises", "comprising", "includes", "including", "having" and their conjugates mean "including but not limited to".

As used herein, the singular form "a", "an" and "the" include plural references unless the context clearly dictates otherwise. For example, the term "a compound" or "at least one compound" may include a plurality of compounds, including mixtures thereof.

Whenever a numerical is indicated herein, it is meant to include other numerals accounting for substantially similar user and agent experience.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present disclosure. To the extent that section headings are used, they should not be construed as necessarily limiting. In addition, any priority document(s) of this application is/are hereby incorporated herein by reference in its/their entirety.

What is claimed is:

1. A computer implemented method of implementing and optimizing a virtual agent for conducting a group activity, the group comprises a plurality of users, the virtual agent comprising a conversational output platform, and the computer implemented method comprising:

using a conversational input platform for acquiring at least one behavioral or emotional aspect of the plurality of users;

analyzing the at least one behavioral or emotional aspect, using a machine learning model; and operating one or more robotic arms and one or more loudspeakers and/or display devices for performing at least one somatic cue for reacting to an action performed by at least one user of the group according to a match between at least one facet of the at least one behavioral or emotional aspect, pertaining to at least one user of the group and an enticer of at least one facilitation pattern, wherein the machine learning model is trained by:

feeding a dataset comprising data from a conversational input platform, and a set of facilitation patterns;

using a machine learning model for determining a goal function based on at least one behavioral or emotional aspect of the group activity, observed through the conversational input platform;

evaluating the goal function using evaluation of at least one behavioral or emotional aspect from at least one segment of the data from the conversational input platform; and updating parameters of the machine learning model, the parameters controlling at least one facilitation pattern from the set of facilitation patterns.

2. The computer implemented method of claim 1, further comprising updating the model according to rules corresponding to at least one following behavior or emotional aspect of the plurality of users.

3. The computer implemented method of claim 2, further comprising personalizing the at least one facilitation pattern addressing the at least one user, using the facet pertaining to the at least one user of the at least one following behavior or emotional aspect of the plurality of users.

4. The computer implemented method of claim 1, wherein at least one behavior patterns is whether a phrase complies with one or more elements of training material.

5. The computer implemented method of claim 1, further comprising collecting at least one following behavior aspect of a user in response to the at least one facilitation pattern, for use in further training of the model.

6. The computer implemented method of claim 1, further comprising comparing the facets of at least one behavior aspect, pertaining to the plurality of users, and applying an additional facilitation pattern chosen on accordance to the comparing.

7. The computer implemented method of claim 6, wherein the facets is related to the participation time as a speaker in the group activity and the facilitation pattern is intended to promote evenness of participation.

8. The computer implemented method of claim 1, wherein the at least one facet is related to expression of an emotion, and the at least one facilitation pattern is intended to help a user manage the emotion.

9. The computer implemented method of claim 1, wherein the conversational input platform is multimodal sensor, comprising audio and video sensors for interacting with the group.

10. The computer implemented method of claim 1, wherein the at least one behavioral or emotional aspect is a preset behavior pattern from a set including little interaction, excessive interaction, and negative response.

11. The computer implemented method of claim 1, wherein at least one facilitation pattern is selected from a group consisting of comprises verbally addressing the least-participating user, verbally suggesting another point of view for a discussion facilitated for the group, displaying a face resembling feature gazing at a specific user.

12. The computer implemented method of claim 1, wherein the machine learning model was trained using a preset knowledge base, comprising preset behavior and emotional patterns and at least one facilitation pattern.

13. The computer implemented method of claim 1, further comprising updating the model by recommendations based on processing at least one behavior aspect of at least one of plurality of users by time-series clustering.

14. A computer implemented method of training a virtual agent for conducting a group activity, the group comprises a plurality of users, the virtual agent comprising a conversational output platform, and the computer implemented method comprising:

feeding a dataset comprising data from a conversational input platform, and a set of facilitation patterns;

using a machine learning model for determining a goal function based on at least one behavioral or emotional aspect of the group activity, observed through the conversational input platform;

evaluating the goal function using evaluation of at least one behavioral or emotional aspect from at least one segment of the data from the conversational input platform; and updating parameters of the machine learning model, the parameters controlling at least one facilitation pattern from the set of facilitation patterns for operating one or more robotic arms and one or more loudspeakers and/or display devices for performing at least one somatic cue for reacting to an action performed by at least one user of the group according to a match between at least one facet of the at least one behavioral or emotional aspect, pertaining to at least one user of the group and an enticer of the at least one facilitation pattern.

15. The computer implemented method of claim 14, wherein the goal function comprises a function of the emotional content of the group.

16. The computer implemented method of claim 14, wherein the goal function comprises a function of the plurality of users' participation in a discussion facilitated for the group.

17. A system for implementing and optimizing a virtual agent for conducting a group activity, the group comprises a plurality of users, the virtual agent comprising a conversational output platform, and the system is configured for:

using a conversational input platform for acquiring at least one behavioral or emotional aspect of the plurality of users;

analyzing the at least one behavioral or emotional aspect, using a machine learning model; and operating one or more robotic arms and one or more loudspeakers and/or display devices for performing at least one somatic cue for reacting to an action performed by at least one user of the group according to a match between at least one facet of the at least one behavioral or emotional aspect, pertaining to at least one user of the group and an enticer of at least one facilitation pattern, wherein the machine learning model is trained by:

feeding a dataset comprising data from a conversational input platform, and a set of facilitation patterns;

using a machine learning model for determining a goal function based on at least one behavioral or emotional aspect of the group activity, observed through the conversational input platform;

evaluating the goal function using evaluation of at least one behavioral or emotional aspect from at least one segment of the data from the conversational input platform; and updating parameters of the machine learning model, the parameters controlling at least one facilitation pattern from the set of facilitation patterns.

18. The system of claim 17, further comprising updating the model according to rules corresponding to at least one following behavior or emotional aspect of the plurality of users.

19. The system of claim 17, further comprising comparing the facets of at least one behavior aspect, pertaining to the plurality of users, and applying an additional facilitation pattern chosen on accordance to the comparing.

20. A computer readable medium having instructions stored thereon, which, when executed by a computer system, cause the computer system comprising a conversational output platform to carry out a computer-implemented method comprising:

using a conversational input platform for acquiring at least one behavioral or emotional aspect of a plurality of users;

analyzing the at least one behavioral or emotional aspect, using a machine learning model; and operating one or more robotic arms and one or more loudspeakers and/or display devices for performing at least one somatic cue for reacting to an action performed by at least one user of the group according to a match between at least one facet of the at least one behavioral or emotional aspect, pertaining to at least one user of the group and an enticer of at least one facilitation pattern, wherein the machine learning model is trained by:

feeding a dataset comprising data from a conversational input platform, and a set of facilitation patterns;

using a machine learning model for determining a goal function based on at least one behavioral or emotional aspect of the group activity, observed through the conversational input platform;

evaluating the goal function using evaluation of at least one behavioral or emotional aspect from at least one segment of the data from the conversational input platform; and updating parameters of the machine learning model, the parameters controlling at least one facilitation pattern from the set of facilitation patterns.

21. The computer implemented method of claim 1, wherein the at least one somatic cue comprises at least one of: a gesture made by the one or more robotic arms, rotating a display device on a rotary pedestal, and displaying a face resembling feature gazing at a specific user.

\* \* \* \* \*